US010199059B2

(12) United States Patent
Ahmad et al.

(10) Patent No.: US 10,199,059 B2
(45) Date of Patent: Feb. 5, 2019

(54) USING HEAD AND/OR DRIVE PERFORMANCE INFORMATION FOR PREDICTING AND/OR ASCERTAINING FAILURES

(71) Applicant: International Business Machines Corporation, Armonk, NY (US)

(72) Inventors: Said A. Ahmad, Tucson, AZ (US); W. Stanley Czarnecki, Palo Alto, CA (US); Ernest S. Gale, Tucson, AZ (US); Icko E. T. Iben, Santa Clara, CA (US); Josephine F. Kubista, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/430,790

(22) Filed: Feb. 13, 2017

(65) Prior Publication Data

US 2017/0169843 A1 Jun. 15, 2017

Related U.S. Application Data

(63) Continuation of application No. 14/967,036, filed on Dec. 11, 2015, now Pat. No. 9,658,784.

(51) Int. Cl.
*G06F 3/06* (2006.01)
*G11B 5/455* (2006.01)
(Continued)

(52) U.S. Cl.
CPC ............ *G11B 5/455* (2013.01); *G06F 3/0616* (2013.01); *G06F 3/0653* (2013.01);
(Continued)

(58) Field of Classification Search
CPC .... G06F 3/0616; G06F 3/0617; G06F 3/0619; G06F 3/0653; G06F 3/0682
(Continued)

(56) References Cited

U.S. PATENT DOCUMENTS 4,456,200 A 6/1984 Ariniello
6,157,507 A * 12/2000 Korenari .................. G11B 5/09
360/53

(Continued)

OTHER PUBLICATIONS

Ahmad et al., U.S. Appl. No. 14/967,036, filed Dec. 11, 2015.
(Continued)

*Primary Examiner* — Gary J Portka
(74) *Attorney, Agent, or Firm* — Zilka-Kotab, P.C.

(57) ABSTRACT

A computer-implemented method, according to one embodiment, includes: collecting performance data corresponding to a tape drive and/or a magnetic tape head, storing the performance data in memory, and using the data to perform problem analysis. The performance data includes a resistance of the tape drive and/or magnetic tape head and a resolution of the tape drive and/or the magnetic tape head. Moreover, performing the problem analysis includes: determining a condition of the tape drive and/or the magnetic tape head, wherein the condition is selected from a group consisting of: wear, corrosion, defective leads and wire bonds. Other systems, methods, and computer program products are described in additional embodiments.

14 Claims, 18 Drawing Sheets

(51) Int. Cl.
  *G11B 5/008* (2006.01)
  *G11B 20/18* (2006.01)
(52) U.S. Cl.
  CPC ........ *G06F 3/0682* (2013.01); *G11B 5/00813* (2013.01); *G11B 20/1816* (2013.01)
(58) Field of Classification Search
  USPC .......................... 711/111; 714/718, 721, 722
  See application file for complete search history.

(56) References Cited

U.S. PATENT DOCUMENTS

| | | | |
|---|---|---|---|
| 7,277,246 B2 | 10/2007 | Barbian et al. | |
| 7,493,234 B2 | 2/2009 | Greco et al. | |
| 7,809,990 B2 | 10/2010 | Sasaki | |
| 8,035,911 B2 | 10/2011 | Ballard et al. | |
| 8,089,714 B2* | 1/2012 | Shitara | G11B 5/455 360/31 |
| 8,406,096 B1 | 3/2013 | Edling et al. | |
| 9,658,784 B1 | 5/2017 | Ahmad et al. | |
| 2004/0199573 A1 | 10/2004 | Schwartz et al. | |
| 2005/0044451 A1 | 2/2005 | Fry et al. | |
| 2005/0228880 A1 | 10/2005 | Champlin | |
| 2007/0046286 A1* | 3/2007 | Umezaki | G11B 5/012 324/210 |
| 2010/0321811 A1 | 12/2010 | Goberis et al. | |
| 2013/0128371 A1* | 5/2013 | Brong | G11B 5/455 360/31 |
| 2014/0297212 A1 | 10/2014 | Anderson | |
| 2015/0255093 A1 | 9/2015 | Biskeborn et al. | |
| 2017/0168733 A1 | 6/2017 | Ahmad et al. | |

OTHER PUBLICATIONS

Non-Final Office Action from U.S. Appl. No. 14/967,036, dated May 19, 2016.
Final Office Action from U.S. Appl. No. 14/967,036, dated Oct. 28, 2016.
Notice of Allowance from U.S. Appl. No. 14/967,036, dated Jan. 13, 2017.
List of IBM Patents or Patent Applications Treated as Related.

* cited by examiner

1400

1450

ΔC1BER=0

USING HEAD AND/OR DRIVE PERFORMANCE INFORMATION FOR PREDICTING AND/OR ASCERTAINING FAILURES

BACKGROUND

The present invention relates to data storage systems, and more particularly, this invention relates to using performance data from tape heads and/or tape drives to predict future failure conditions.

In magnetic storage systems, magnetic transducers read data from and write data onto magnetic recording media. Data is written on the magnetic recording media by moving a magnetic recording transducer (Writer) to a position over the media where the data is to be stored. The Writer then generates a magnetic field, which encodes the data into the magnetic media. Data is read from the media by similarly positioning the magnetic read transducer (Reader) and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A computer-implemented method, according to one embodiment, includes: collecting performance data corresponding to a tape drive and/or a magnetic tape head, storing the performance data in memory, and using the data to perform problem analysis. The performance data includes a resistance of the tape drive and/or magnetic tape head and a resolution of the tape drive and/or the magnetic tape head. Moreover, performing the problem analysis includes: determining a condition of the tape drive and/or the magnetic tape head, wherein the condition is selected from a group consisting of: wear, corrosion, defective leads and wire bonds.

A computer program product, according to another embodiment, includes a computer readable storage medium having program instructions embodied therewith, the program instructions executable by a controller to cause the controller to: collect, by the controller, performance data corresponding to a tape drive and/or a magnetic tape head, store, by the controller, the performance data in memory, and use, by the controller, the data to perform problem analysis. The performance data includes a resistance of the tape drive and/or magnetic tape head and a resolution of the tape drive and/or the magnetic tape head. Moreover, performing the problem analysis includes: determining, by the controller, a cause of an issue of the tape drive and/or the magnetic tape head, wherein the cause of the issue is selected from a group consisting of: wear, corrosion, defective leads and wire bonds.

A system, according to yet another embodiment, includes: a processor and logic integrated with and/or executable by the processor, the logic being configured to cause the processor to: collect performance data corresponding to a tape drive and/or a magnetic tape head, store the performance data in memory, and use the data to perform problem analysis. The performance data includes a resistance of the tape drive and/or magnetic tape head and a resolution of the tape drive and/or the magnetic tape head. Moreover, performing the problem analysis includes: determining a condition of the tape drive and/or the magnetic tape head, wherein the condition is selected from a group consisting of: wear, corrosion, defective leads and wire bonds.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

Figure 1A:
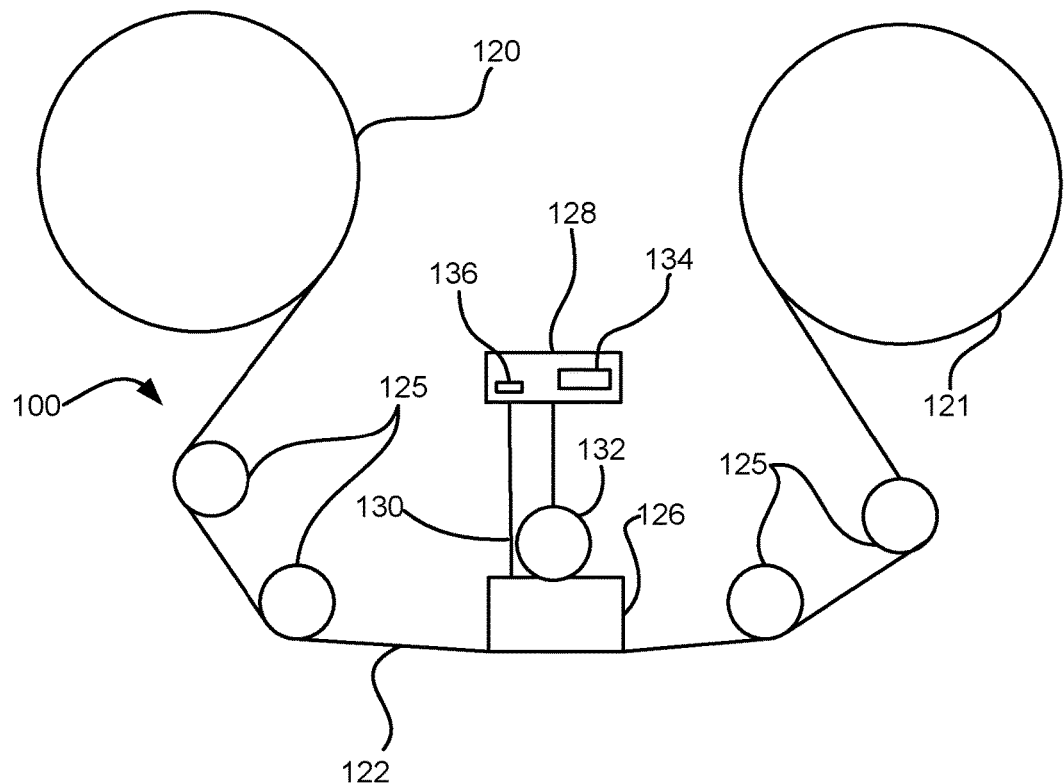
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a computer-implemented method includes collecting, by the computer, performance data corresponding to a tape drive and/or a magnetic tape head. The performance data is stored in memory, and used by the computer to perform problem analysis. The performance data may include data such as one or more of a current and/or a voltage applied to one or more transducers in the magnetic tape head, a signal to noise ratio, a bit error rate, a resistance of a read sensor in the magnetic tape head, a read-back amplitude of the read sensor, asymmetry of the read-back amplitude, resolution, spacing loss, whether a magnetic orientation of a magnetic layer is reversed for one or more of the transducers whether a short has occurred.

In another general embodiment, a computer-implemented method includes collecting, by the computer, performance data corresponding to a tape drive and/or a magnetic tape head. The collected performance data is condensed to reduce a size of the collected performance data. The condensed performance data is stored in memory, and used to perform problem analysis.

In yet another general embodiment, a computer-implemented method includes collecting, by the computer, performance data corresponding to a tape drive and/or a magnetic tape head. The performance data is stored in memory, and used by the computer to perform problem analysis. Performing the problem analysis includes predicting future failure conditions of the tape drive and/or the magnetic tape head.

In one general embodiment, a computer program product includes a computer readable storage medium having program instructions embodied therewith, the program instructions readable and/or executable by a controller to cause the controller to collect, by the controller, performance data corresponding to a tape drive and/or a magnetic tape head. The performance data is stored in memory, and used to perform problem analysis. Performing the problem analysis includes tracking changes to the performance data over time, and extrapolating future failure conditions of the tape drive and/or the magnetic tape head from the tracked changes in the performance data.

In another general embodiment, a system includes a processor and logic integrated with and/or executable by the processor, the logic being configured to cause the processor to collect performance data corresponding to a tape drive and/or a magnetic tape head, where the performance data includes a resistance of the tape drive and/or magnetic tape head and a resolution of the tape drive and/or the magnetic tape head. The logic is also configured to cause the processor to store the performance data in memory, and use the data to perform problem analysis. Performing the problem analysis includes determining at least one of wear, corrosion, and defective leads or wire bonds of the tape drive and/or the magnetic tape head.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the drive 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both. Servo transducers are also used to locate the read/write transducers on the appropriate tracks. Since servo transducers are similar to data readers, just with different geometries, for the purpose of this disclosure, a read element may also refer to a servo read element.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
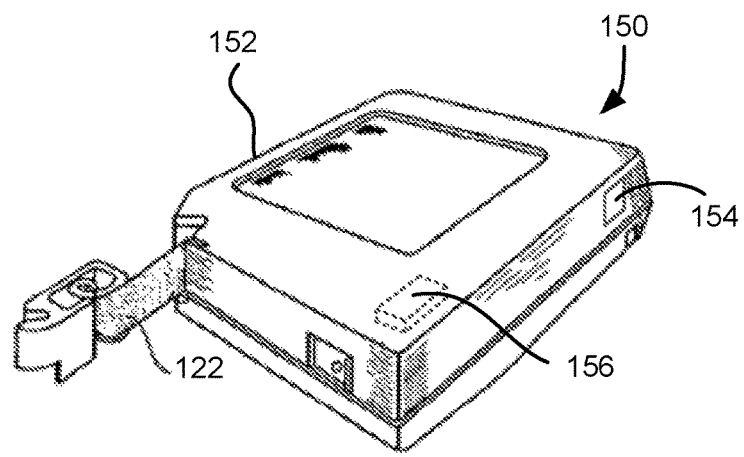
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some embodiments, the nonvolatile memory 156 may be embedded inside the housing 152, as shown in FIG. 1B. In more embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, read-only memory (ROM) device, etc., embedded into or coupled to the inside or outside of the tape cartridge 150. The nonvolatile memory is accessible by the tape drive and the tape operating software (the driver software), and/or other device.

Figure 2A:
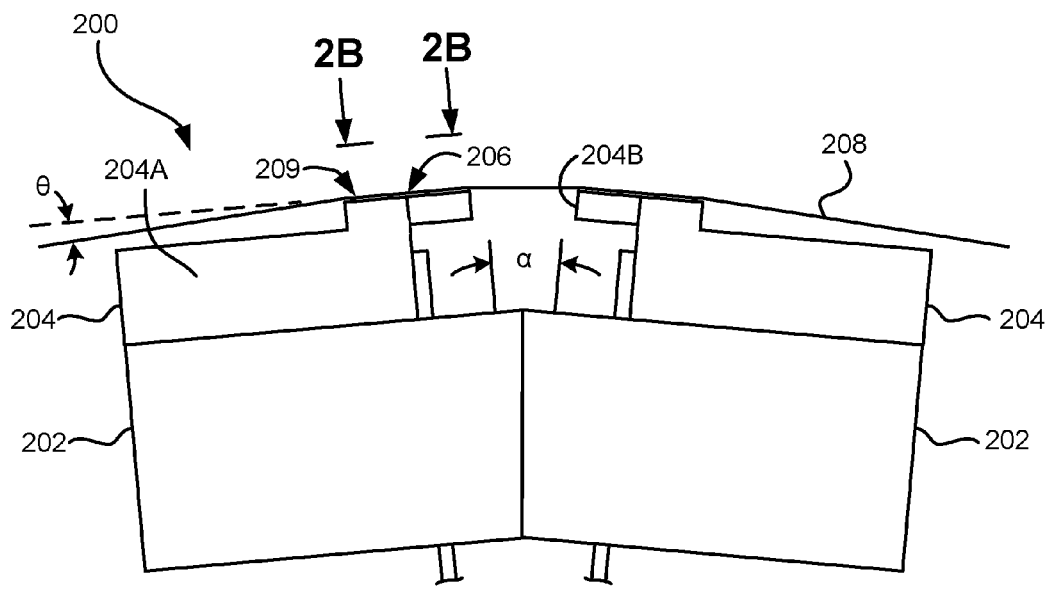
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2B:
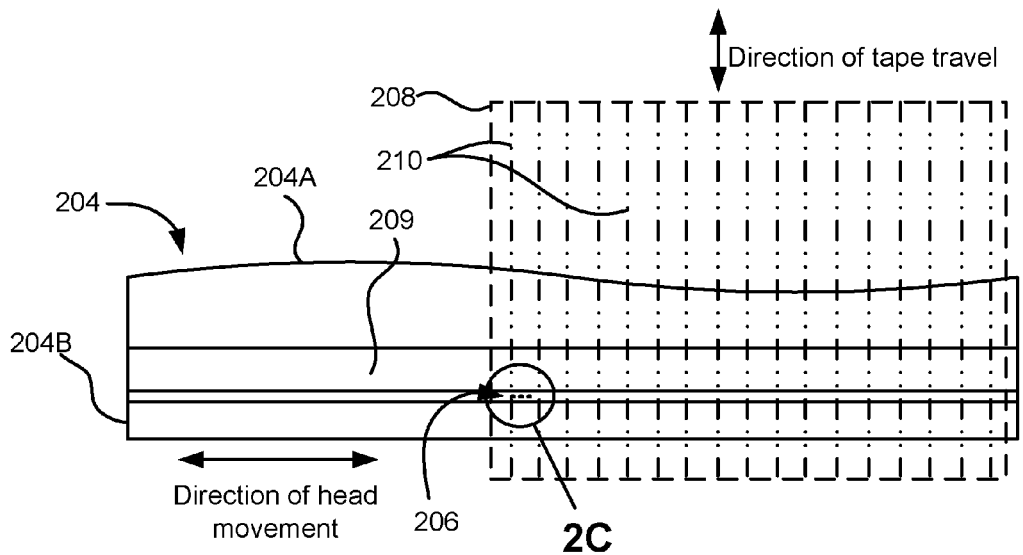
FIG. 2B is a tape bearing surface view taken from Line 2B of FIG. 2A.

FIG. 2B illustrates the tape bearing surface 209 of one of the modules 204 taken from Line 2B of FIG. 2A. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2B on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2C:
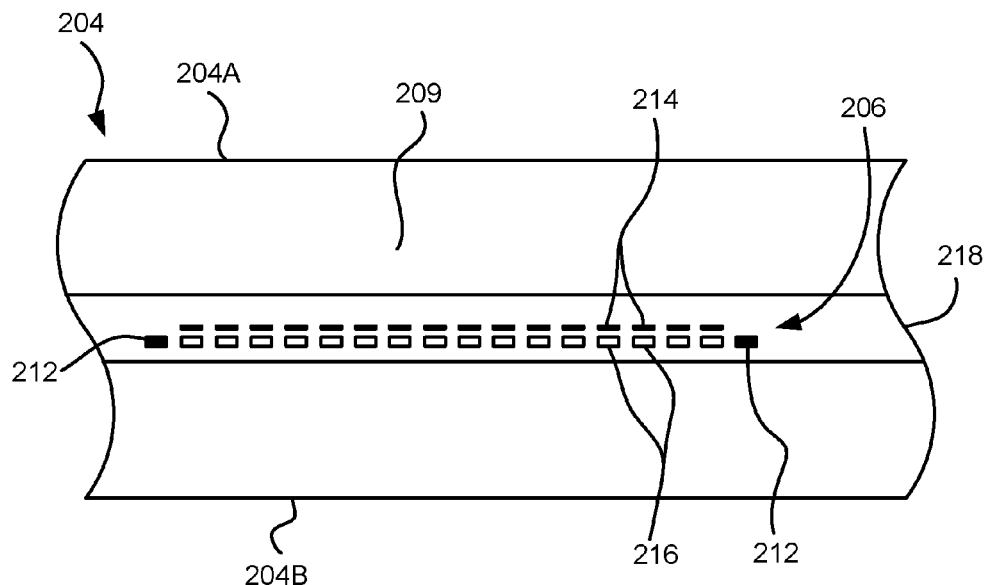
FIG. 2C is a detailed view taken from Circle 2C of FIG. 2B.

FIG. 2C depicts a plurality of readers and/or writers 206 formed in a gap 218 on the module 204 in Circle 2B of FIG. 2B. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2C, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2D:
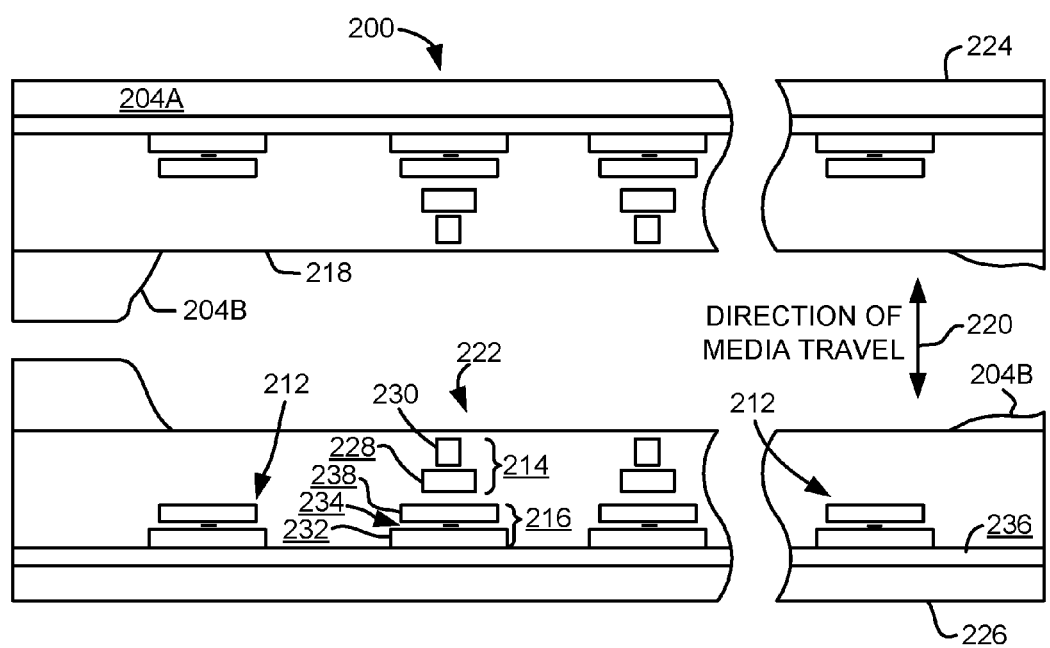
FIG. 2D is a detailed view of a partial tape bearing surface of a pair of modules.

FIG. 2D shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeable. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked magnetoresistive (MR) head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, TMR, etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 4:
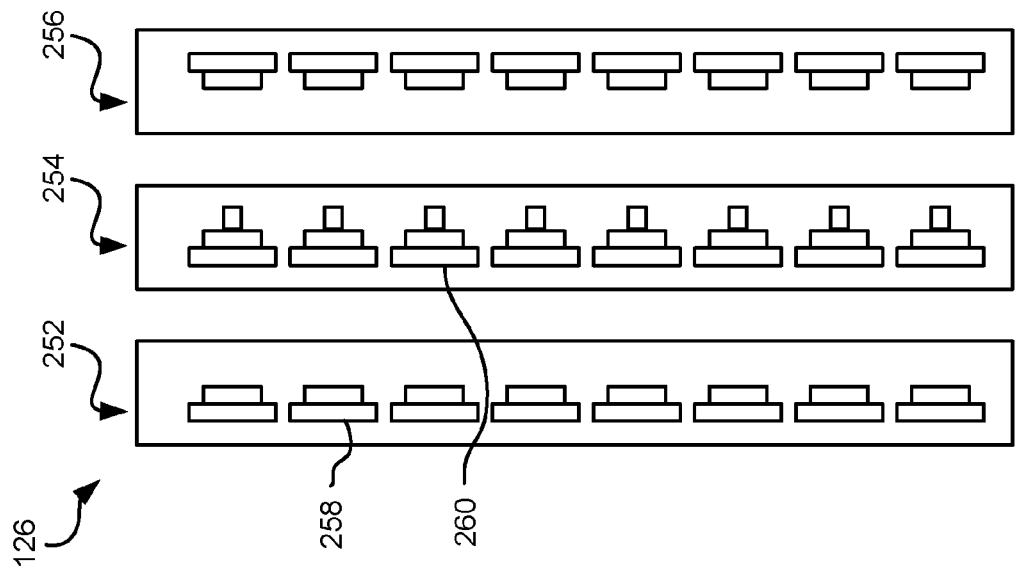
FIG. 4 is a partial tape bearing surface view of a magnetic head having a read-write-read configuration.
Figure 3:
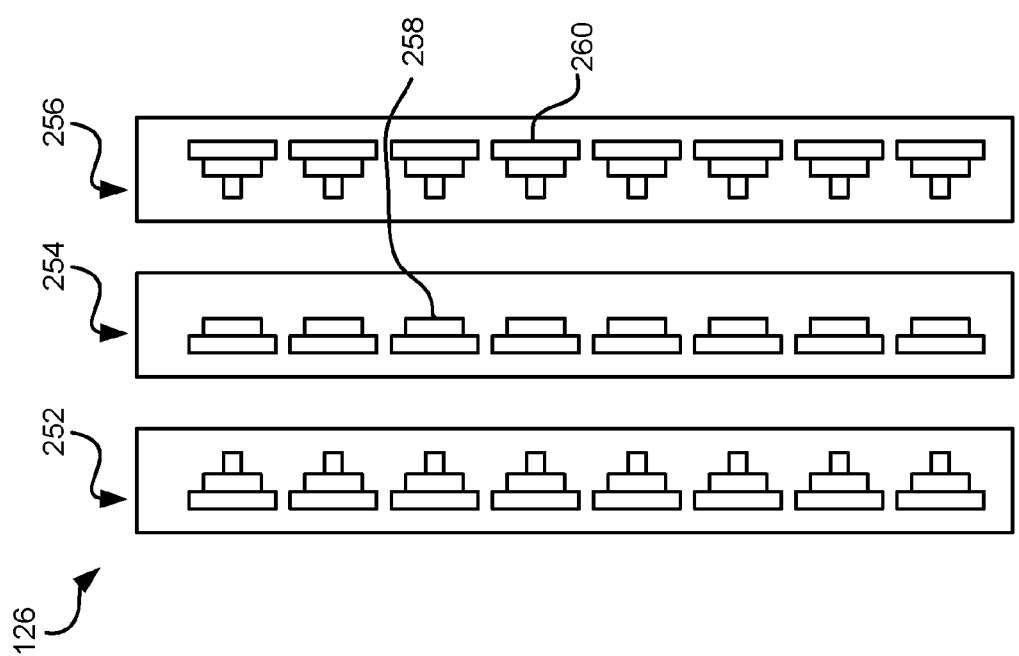
FIG. 3 is a partial tape bearing surface view of a magnetic head having a write-read-write configuration.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further embodiments, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
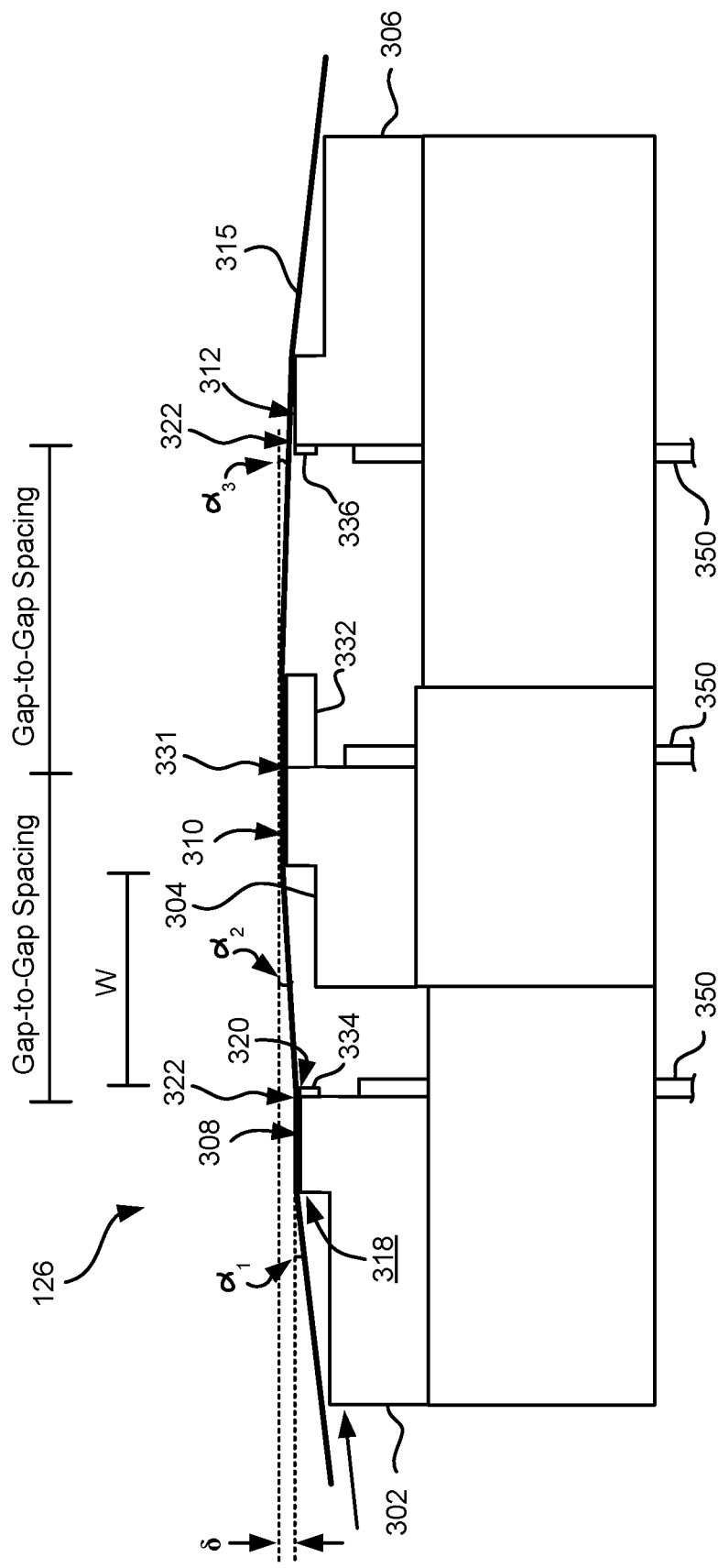
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
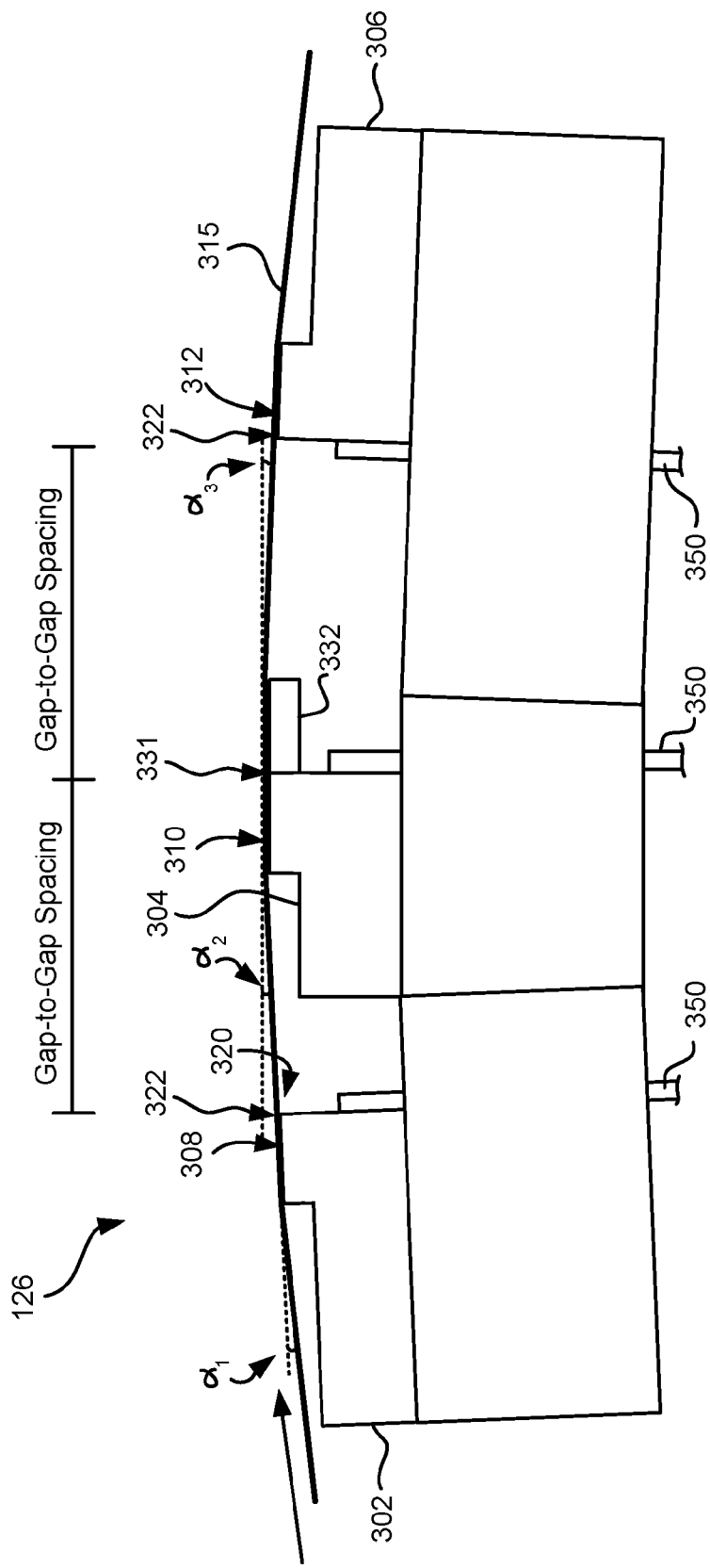
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the spacing between the substrate and closure (SC-span), the SC-span length can be substantially reduced. Typical heads have piggybacked readers and writers, where the writer is formed above each reader. A typical SC-span is 20-35 microns. However, irregularities on the tape may tend to droop into the SC-span and create SC-span erosion. Thus, the smaller the SC-span is the better. The smaller SC-span enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
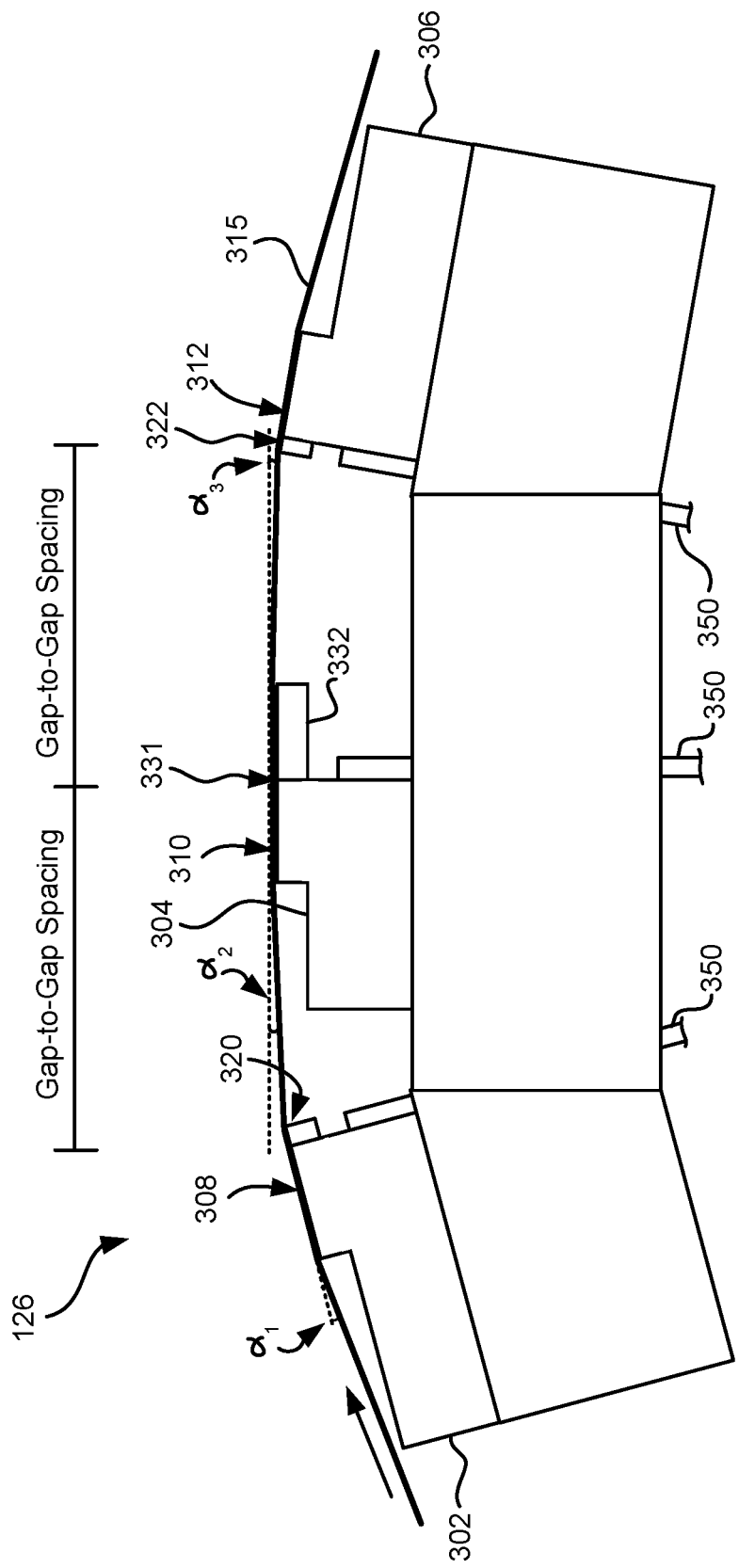
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other embodiments, the modules may be constructed as a unitary body. Those skilled in the art, armed with the present teachings, will appreciate that other known methods of manufacturing such heads may be adapted for use in constructing such heads.

The performance of the Read/Write heads can degrade over time. The degradation is often gradual, but may not be evident in the written data capacity. For a degrading tape head, at some level of Read/Write errors, the drive will fail. Sudden failure can be disruptive to the user of the tape drive. A means of predicting when the failure occurred can allow the operator to replace the degrading head in a controlled manner, avoiding data loss and/or extra recovery time.

Tape drives are used in a wide number of embodiments to store large amounts of data. Thus, if a tape drive fails suddenly, a significant amount of time and effort is consumed to rapidly replace the failed drive in addition to determining how much of the data which was in the process of being written to tape when the drive failed should be re-written on the same, or a different tape, e.g., due to write errors caused by the failed tape drive.

When a failure occurs, the history of the tape drive's performance and the corresponding functional parameters may be used to determine the cause of the tape drive failure. In some embodiments, the performance information and functional parameters associated with a given tape drive and/or a magnetic head thereof may be used to improve failure analysis which may assist in avoiding future problems. However, internal memory for tape drives is limited and therefore the amount of information which may be stored for a given tape drive may be limited as well.

Some tape drives collect and store drive information in a file called a "dump" which contains a relatively large amount of data. In view of the limited amount of internal storage space in a tape drive, a limited number of dump files may be maintained in a given tape drive. According to an example which is in no way intended to limit the invention, a dump file may be collected and stored when the tape drive is first built $Dump_{timeIntial}$, and a second dump file may be collected and stored which gives the final state of the tape drive $Dump_{timeFinal}$. However, $Dump_{timeFinal}$ cannot be retrieved if the corresponding tape drive has experienced a failure, and reconstructing the large amount of data included in a dump file is difficult.

Furthermore, dump files are often not structured and thus the time to extract a given data parameter is slow, and often the relevant parameters may not even have been stored at the same time/use time point. Because of the above mentioned limitations, reconstructing when a failure occurred and posting a warning to the drive operator prior to a failure is too slow to be practical and reconstructing the cause of the failure and when it occurred is difficult, if not impossible.

Furthermore, some failure conditions, such as corrosion of the read elements included in a tape drive, may be initiated at a point in time although the drive continues to operate. Thus, even after the drive finally fails and is replaced, the corrosive agent may still linger and take hold in the replacement drive, thereby causing the replacement drive to fail as well. In some embodiments, parameters of the tape drive may be used to identify the initial corrosion incident which may then be recorded, and the cause of which may be searched for. Thus, warning systems and/or more complete records of the performance and functional parameters for a given tape drive may aid in reducing the number of failures experienced, as will be described in further detail below.

It follows that various embodiments described herein may collect data relevant to the performance and/or health of a given tape drive. Moreover, depending on the type of data collected, it may be used to improve tape drive performance in different ways as will soon become apparent.

Figure 8A:
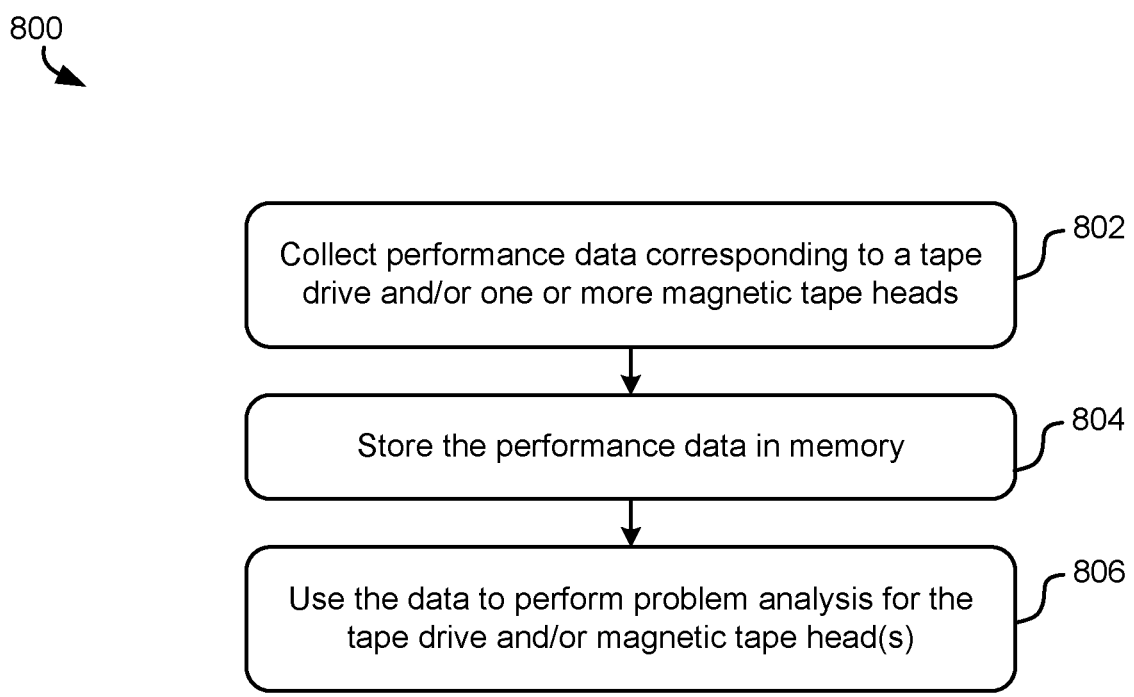
FIG. 8A is a flowchart of a method according to one embodiment.

Looking to FIG. 8A, a flowchart of a method 800 is shown according to one embodiment. The method 800 may be performed in accordance with the present invention in any of the environments depicted in FIGS. 1A-7, among others, in various embodiments. Of course, more or less operations than those specifically described in FIG. 8A may be included in method 800, as would be understood by one of skill in the art upon reading the present descriptions.

Each of the steps of the method 800 may be performed by any suitable component of the operating environment. For example, in various embodiments, the method 800 may be partially or entirely performed by a controller, a processor, etc., or some other device having one or more processors therein. According to a specific example, one or more of the processes of method 800 may be implemented by a computer. Thus, method 800 may be a computer-implemented method. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8A, operation 802 of method 800 includes collecting performance data corresponding to a tape drive and/or one or more magnetic tape heads. The type of performance data collected may vary according to different embodiments. For instance, the performance data collected may be based on a user's request, pre-identified types of data, performance conditions, analysis of data already collected, areas of interest, specific applications of the tape drive and/or magnetic tape head(s) included therein, etc., depending on the desired embodiment. According to an example, a tape drive designed for a particular application (e.g., based on user specifications) may be preset to collect certain performance data which corresponds to the application for which it was designed.

According to various approaches, the performance data collected in operation 802 may include any one or more of: a current and/or a voltage applied to one or more transducers in a magnetic tape head, a SNR, a C1 and/or C2 BER, a resistance of a read sensor in a magnetic tape head, resistance of data and/or servo elements, a read-back amplitude of the read sensor, asymmetry of the read-back amplitude, a number of rewrite attempts performed by a write transducer in a magnetic tape head, a data quantity written to tapes, a PW50 head-tape-spacing, capacity loss, whether the magnetic orientation of a magnetic layer (e.g., Antiferromagnet) is reversed for one or more of the transducers (e.g., for a GMR, AMR, etc. sensor), asymmetry, whether a short has occurred in a Reader, a number and/or a frequency of write temporary errors, a number and/or frequency of permanent errors, a data transfer rate, the data read-write rates, the time to write the data on a tape, the number of tapes on which data has been written, a resistance of the Readers and Writers in the magnetic tape head(s), a resolution of the read-back signals for the Readers in the tape drive and/or the magnetic tape head(s), the stripe height (SH) of the Read sensors etc. It should be noted that the aforementioned list of potential performance data types is in no way intended to be limiting, and may include any other type(s) of performance data and/or functional parameters which would be apparent to one skilled in the art upon reading the present description. According to a preferred approach, the performance data collected in operation 802 is sufficient to reconstruct when a change in the performance of the tape drive and/or the read and/or write elements of a magnetic tape head in the tape drive occurred.

For clarification, several of the aforementioned performance parameters will be defined:
C1BER: BER of an individual channel of the drive
C2BER: Overall BER for all data channels of the drive
SH: Height of the Reader in the direction perpendicular to the Tape Bearing Surface (TBS)
1F: highest frequency (inverse length) of the data
2T: 2× the transition length of 1F
8T: 8× the transition length of 1F
Amplitude: Vmax+Vmin, where Vmax is the magnitude of the maximum positive read voltage and Vmin is the magnitude of the maximum negative voltage
Asymmetry: (Vmax−Vmin)/Amplitude
Resolution: Ratio of Amplitude at two different frequencies, e.g. Amplitude (2T)/Amplitude (8T)
Head-Tape Spacing: Distance between the read transducer at the TBS and the magnetic tape surface
PW50: Half amplitude pulse width, or width of the written data at half the peak amplitude
Capacity: Amount of data stored in a tape cartridge, e.g. 1 TB or 20 TB to fill the tape cartridge, etc.
Wrap: Data is written to a tape cartridge by running tape across a head from a physical beginning of tape (BOT) to end of tape (EOT) and all Writers write simultaneously to a data track. One pass from BOT to EOT is a Wrap Full File Pass (FFP): A tape cartridge can be filled with a specific number of Wraps, call that Nwrapmax. Running Nwrapmax Wraps is termed a FFP.

The process of collecting the performance data may also vary depending on the type of performance data being collected. According to some approaches, collecting the performance data includes collecting performance data from all of the transducers included in a tape drive. In other approaches, performance data may only be collected from a subset of all transducers included in a tape drive. Further still, different types of performance data may be collected from different subsets of the transducers in a tape drive. Subsets of transducers may be determined based on a level of performance, a health of the transducers, an evaluation of already collected performance data, specified conditions, etc. It follows that types of data collected and/or the transducers for which the performance data is collected may vary and be updated as performance changes over time. The performance data is preferably collected multiple times during the use of the tape drive which may be specified by real time intervals, different use time intervals, such as tape usage intervals, specific conditions of the drive performance, etc. Moreover, in some approaches all data which is collected may be stored in memory, while in other approaches, only a subset of the data collected may actually be stored in memory, e.g., see FIG. 10 below.

With continued reference to FIG. 8A, method 800 also includes storing the performance data in memory. See operation 804. As mentioned above, the performance data is preferably stored for use in performing problem analysis, e.g., predicting whether the tape drive and/or magnetic tape heads have performance issues, e.g., as will be described in further detail below. Depending on the desired approach, some or all of the collected performance data may be stored on a hard drive, on a designated tape cartridge, on a non-volatile random access memory drive (e.g., Flash memory) in the tape drive and/or server external to the tape drive, on a secure external intranet accessible storage site, etc. For approaches implementing data storage at locations external to the tape drive, the tape drive and external memory location may be partitioned, e.g., for access by a tape drive service team. Moreover, implementing a firewall between the tape drive customer data and the tape drive service team data may be desired, e.g., with encryption of the data.

Operation 806 of method 800 further includes using the data to perform problem analysis for the tape drive and/or magnetic tape head(s). According to preferred approaches, the problem analysis includes predicting future failure conditions of the tape drive and/or the magnetic tape head. It should be noted that a failure condition is not limited to total failures of the tape drive and/or magnetic tape head(s). Rather, according to different approaches, a failure condition may include a partial failure, e.g., a failure of one or more individual transducers, inoperability of one magnetic tape head in a tape drive, etc.; a total failure, e.g., complete inoperability of the tape drive; a drop in data storage capacity below a specific limit (which may be set at the maximum allowed by the cartridge or some percentage of the maximum allowed); excessive amount of data rewrites or rewrite rates; a minimum BER; etc., depending on the desired embodiment. Problem analysis may be performed by a user (e.g., human analysis of the provided data), automated in the tape drive code, performed by a computer, etc. Moreover, in some approaches, problem analysis may be improved by implementing a learning curve which couples stored data with a determined failure mechanism as would be appreciated by one skilled in the art upon reading the present description.

Figure 8B:
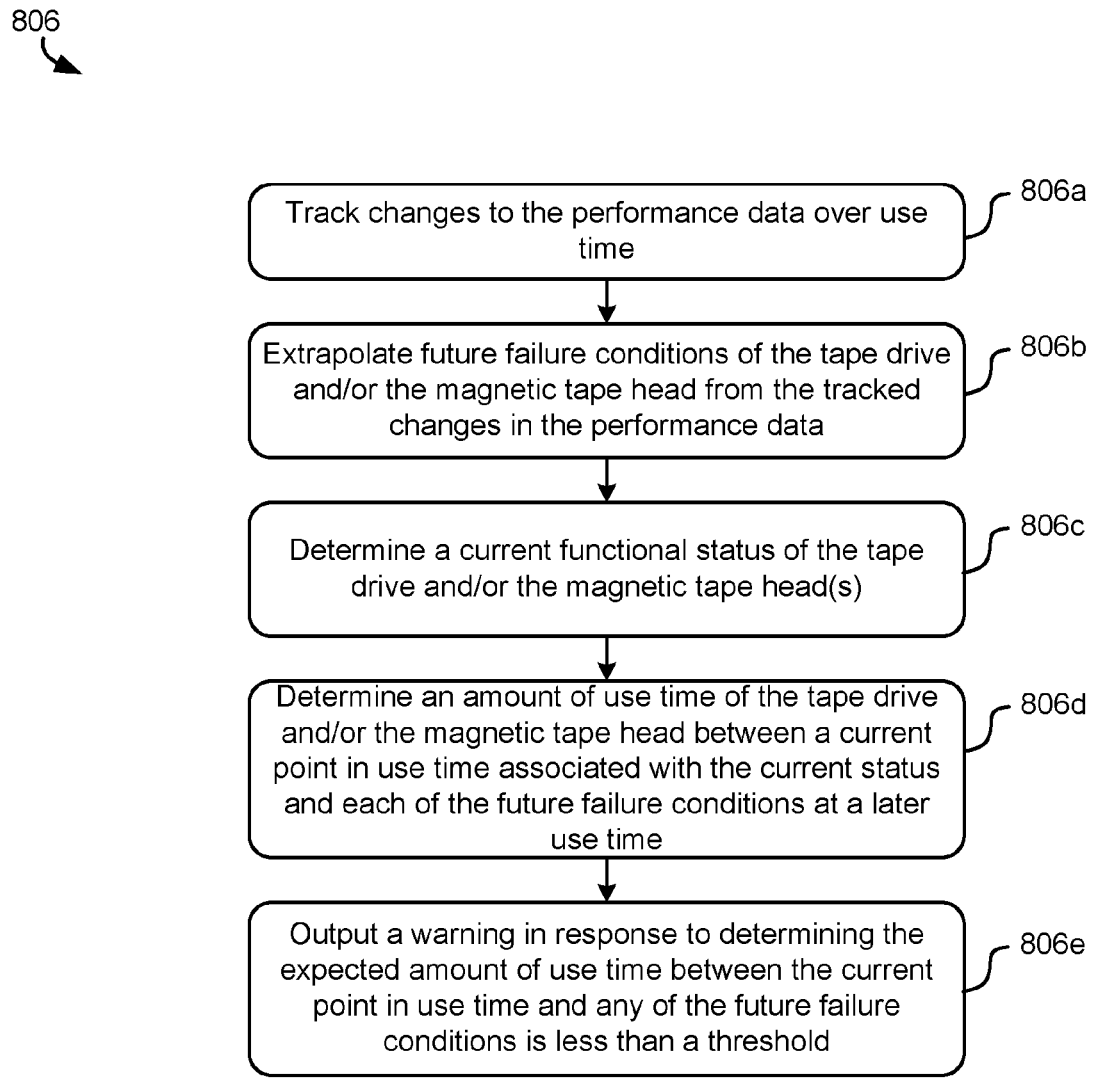
FIG. 8B is a flowchart of sub-operations of the method in FIG. 8A according to one embodiment.

Referring now to FIG. 8B, sub-operations corresponding to the performance of operation 806 are shown according to one embodiment. The sub-operations of FIG. 8B may be performed in accordance with the present invention in any of the environments depicted in the other FIGS., such as FIG. 8A, among others, in various embodiments. Of course, more or less operations than those specifically described in FIG. 8B may be included in the sub-operations illustrated therein, as would be understood by one of skill in the art upon reading the present descriptions.

As shown, operation 806 may include tracking changes to the performance data over use time. See sub-operation 806a. A useful concept is use time, which is a measure of the usage of the drive. Examples of use time are: time since the drive was manufactured; time the drive has been powered on; number of tape cartridges mounted onto the drive; number of FFP for either data read-only passes or for data write passes; amount of data written to or read from tape; etc.

Tracking changes to the performance data may include changing a sampling rate of the performance data, flagging subsets of the stored performance data, making a duplicate copy of a subset of the performance data, sending a notification to a user, etc., e.g., in response to satisfying a condition (e.g., see FIG. 10B below). According to some approaches, performing the problem analysis may include reconstructing when a change in performance of the tape drive and/or the magnetic tape head(s) occurred. Thus, by tracking changes to the performance data over use time, the ability to reconstruct when a certain change occurred may be possible at a future point in use time.

Moreover, sub-operation 806b includes extrapolating (e.g., predicting) future failure conditions of the tape drive and/or the magnetic tape head from the tracked changes in the performance data. According to an example, a resistance of a magnetic head may be used to perform problem analysis and extrapolate future failure conditions. Tape drives are designed to be robust to ranges of amplitudes of the device and ranges of signal-to-noise ratios (SNR). Accordingly, BER may not be negatively affected until amplitudes and/or SNR are below a given level (e.g., a threshold). Therefore, by collecting changes in the performance data over use time, e.g., such as $R_{head}$, SNR, amplitudes of the device, etc., an extrapolation may be made as to when certain performance data is expected to drop below a critical value. Thus, predicted (e.g., projected) failure conditions may be determined well before poor BERs are experienced or a drop in data storage capacity.

Figure 9:
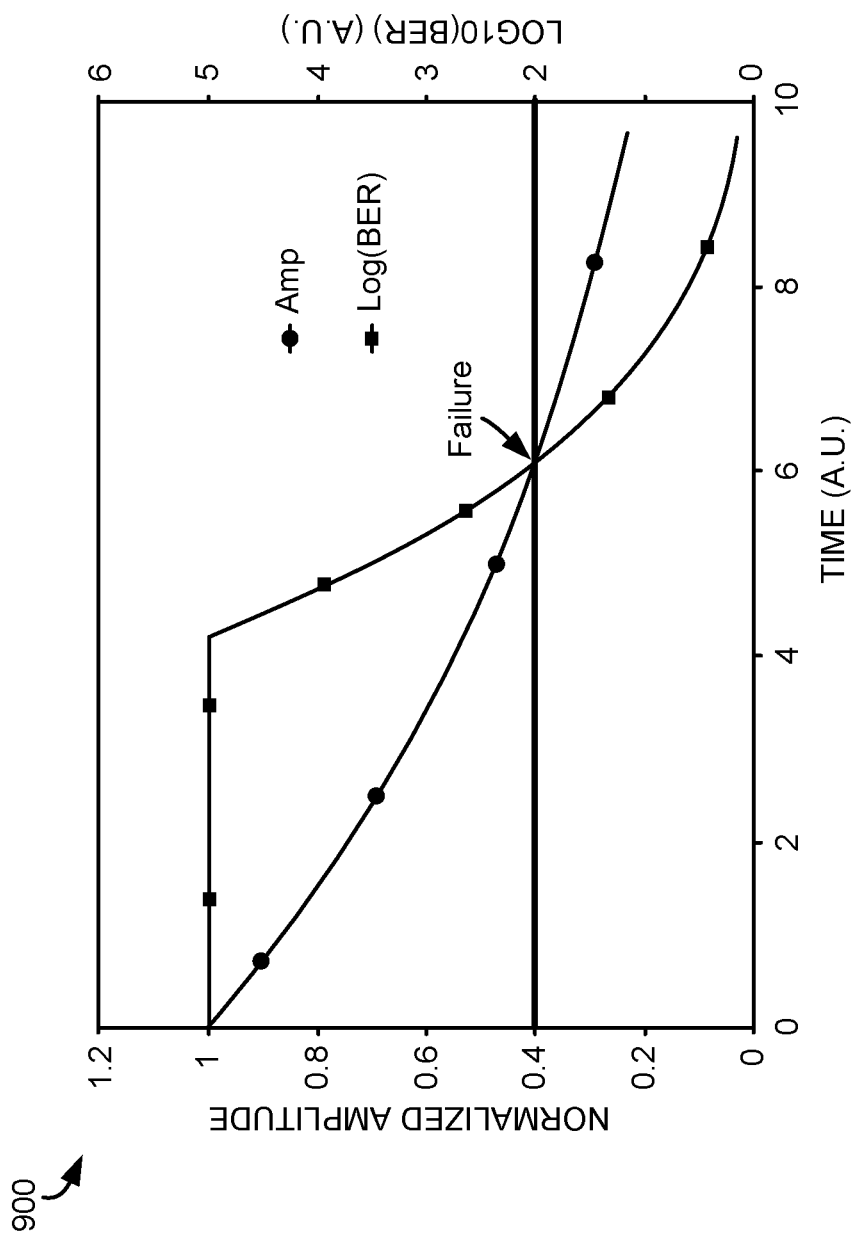
FIG. 9 is a normalized amplitude vs. bit error rate vs. time graph according to one embodiment.

Referring momentarily to of FIG. 9, graph 900 illustrates a simulated plot of amplitude and BER versus time. As shown, while the Amplitude is dropping steadily and predictably, the BER is not affected until the Amplitude falls below a normalized amplitude of about 0.5, at which point the BER begins to drop rapidly. Where the plots for Amplitude and BER meet represents a resulting failure (as indicated in graph 900) in the corresponding tape drive. It follows that, by studying the connection between the Amplitude and BER plots, the steady drop in Amplitude may be used to project when the BER will begin to degrade, even at a point in time when the BER is at a steady, desirable value. It follows that the potential issues associated with the amplitude loss can be predicted sooner and more accurately using the Amplitude corresponding to a given embodiment, either alone or in conjunction with the corresponding BER.

Thus, it should again be noted that a failure condition is not limited to total failures of the tape drive and/or magnetic tape head(s). Rather, according to different approaches, a failure condition may include a partial failure, e.g., a failure of one or more individual transducers, inoperability of one magnetic tape head in a tape drive, etc.; a total failure, e.g., complete inoperability of the tape drive; etc. By extrapolating future failure conditions, actions may be taken in anticipation of the failure conditions which may prevent the effects of such conditions, e.g., by examining a current condition of the tape drive and/or magnetic tape head(s), as will soon become apparent.

Moreover, an important aspect of using performance data includes evaluating past data in addition to present data. The current state of a tape drive is often collected and stored periodically over a period of time. As described above, performance data pertaining to a tape drive may be collected at an inception of the tape drive (e.g., see Dump$_{timeIntial}$ above) and also stored. Thus, tape drive performance data from an initial point in time may be compared against performance data from a current point in use time to determine a state of the tape drive and/or project future failure conditions. For example, if a magnetic head included in a tape drive is wearing with use time and the read amplitude in reader(s) of the magnetic head is dropping, the rate at which the amplitude drops may be used to extrapolate a future failure condition.

Accordingly, with continued reference to FIG. 8B, sub-operation 806c includes determining a current functional status of the tape drive and/or the magnetic tape head(s). As mentioned above, the current status of the tape drive and/or the magnetic tape head may be used in combination with past performance data and future failure analysis in order to assist in preventing the effects of future failure conditions. Accordingly, sub-operation 806d includes determining (e.g., calculating) an amount of use time of the tape drive and/or the magnetic tape head between a current point in use time associated with the current status and one or more of the future failure conditions. In other words, sub-operation 806d may determine a number of tape runs, write operations, tape mount operations, an amount of real time, etc., between a current point in use time and each of the extrapolated future failure conditions (at a later use time). Note, as described above, that the user can utilize various metrics to represent the use time which separates a current point in use time and each of the future failure conditions, e.g., depending on the desired embodiment.

According to one approach, the collected performance data may be used to determine the current functional status of the tape drive and/or the magnetic tape head(s) by comparing the performance data to a range separating acceptable (e.g., good) and unacceptable (e.g., bad) status for the tape drive and/or magnetic tape head(s). Thus, the tape drive and/or magnetic tape head(s) may be deemed acceptable (e.g., healthy) in response to the performance data falling within a certain range, and alternatively unacceptable (e.g., unhealthy) in response to the performance data falling outside the range. It should be noted that "within a certain range" and "outside the range" are in no way intended to limit the invention. Rather, than determining whether the performance data is within or outside a certain range, equivalent determinations may be made, e.g., as to whether the performance data is above a threshold, below a threshold, having an absolute value above a threshold, having an absolute value within a range, etc., depending on the desired approach.

According to a specific example, which is in no way intended to limit the invention, Equation 1 may be used to predict a future failure condition with respect to "x", where x represents the use time, which may be the amount of real time since the drive was manufactured, the time the drive has been powered on, a number of tapes mounted onto the drive, a total number FFP, a total amount of data written, etc., or some other measure of use.

$$f_1(x)=a_o+a_1*x \qquad \text{Equation 1}$$

Here, $a_o$ and $a_1$ are fitted parameters for fitting the collected data as would be appreciated by one skilled in the art upon reading the present description. Again, by fitting the collected performance data to a monotonically changing function as shown in Equation 1, a future failure condition with respect to x may be determined.

According to a similar example, a quadratic equation may be used, e.g., as shown in Equation 2.

$$f_2(x)=a_o+a_1*x+a_2*x^2 \qquad \text{Equation 2}$$

Again, $a_o$ and $a_1$, as well as $a_2$ are fitted parameters, as would be appreciated by one skilled in the art upon reading the present description.

In another example, an exponential equation may be used to predict a future failure condition with respect to "x", as shown in Equation 3.

$$f_3(x)=F+D*e^{(c*x)} \qquad \text{Equation 3}$$

where c, D and F are fitted parameters, as would be appreciated by one skilled in the art upon reading the present description.

According to another example, a stretched exponential equation may be used to predict a future failure condition with respect to "x", as shown in Equation 4.

$$f_4(x)=F+D*e^{(c*x^b)} \qquad \text{Equation 4}$$

Again, c, D and F, as well as b are fitted parameters.

In yet another example, a combination of Equations 5.1-5.4 may be used in combination with Equations 1-4 respectively, to predict a future failure condition with respect to "x".

$$G_1*f_1(y_1) \qquad \text{Equation 5.1}$$

$$G_2*f_2(y_2) \qquad \text{Equation 5.2}$$

$$G_3*f_3(y_3) \qquad \text{Equation 5.3}$$

$$G_4*f_4(y_4), \qquad \text{Equation 5.4}$$

Here, $y_j=x-x_{jo}$, where $G_j=0$ for $x<x_{jo}$, and $G_j=1$ for $x\geq x_{jo}$. Alternatively, $G_j=0$ for $x\geq x_{jo}$, and $G_j=1$ for $x<x_{jo}$. Furthermore, D, F, c, b, $G_j$ and $x_{jo}$ are fitted parameters, as would be appreciated by one skilled in the art upon reading the present description.

It should again be noted that the above examples are presented by way of example only, and are in no way intended to limit the invention. Rather, other functions may be used to determine a future failure condition, e.g., when a performance data parameter will fall outside an acceptable range as described above.

Referring again to FIG. 8B, sub-operation 806e includes outputting a warning, e.g., to a user, in response to determining the expected amount of use time between the current point in use time and a projected real time when any of the future failure conditions is projected to be less than a threshold. The expected amount of use time may be predefined, calculated using known methods, updated based on performance data, etc. It should be noted that "less than a threshold" is in no way intended to limit the invention. Rather, than determining whether a value is less than a threshold, equivalent determinations may be made, e.g., as to whether the performance data is above a threshold, within or outside a certain range, having an absolute value above a threshold, having an absolute value within a range, etc., depending on the desired approach.

A threshold may be measured based on the amount of use of the tape drive and/or the magnetic tape head between a current point in use time associated with the current status and one or more of the future failure conditions. According to different approaches, a warning may be output in response to the amount of use dropping a factor Df below an initial amount. Df may be any percentage between 100% and 0% which the manufacturer of the tape drive or the user of the tape drive chooses as a limit based on an effective lifetime of the tape drive. For example, a user may choose a value of 75% for Df with Capacity being the metric of choice. Through statistics, it may be determined that if M of the total N tracks have a C1BER below some clip level, then the drive capacity will fall below 75%, then one might use the degradation of C1BER to project the failure use time point. Similar calculations may be done using SNR and SNR equivalent. If a tape drive continues to operate despite one or more warnings being output, the tape drive may be quarantined (e.g., purposefully deactivated) in response to the amount of use between a current point in use time and one or more future failure conditions falling below a critical level, e.g., a Df value of 75% of an initial amount of use based on an effective lifetime of the tape drive. A separate warning may be sent, e.g., to a user, to indicate that the tape drive has been quarantined and that replacement and/or repair of the quarantined tape drive is desired before read and/or write requests may be performed.

As an example, assume that it is determined that if a drive has 8 tracks with C1BER below 1000 bit-per-error then the drive capacity will fall below 75%, and 3 tracks have fallen below 1000 bit-per-error with a rate of 1 per 50 FFP, and Equation 1 is able to fit the data, where f1 is the number of tracks below 1000 bit-per-error, and ao=0 and a1=1/50 FFP$^{-1}$, then the algorithm may project a failure at x=400 FFP. Along with the use time, a projected real time can be calculated based on past usage. In the example above, if the drive has been performing 21 FFP/week, then the failure point can be projected to be 5*50 FFP/(21 FFP/week) or 11.9 weeks.

The warning output may include the amount of use time between the current point in use time and any of the future failure conditions, in addition to the predicted points in use time that each of the failure conditions will occur. Thus, appropriate steps may be taken in order to postpone and/or prevent the effects of the future failure conditions. It should be noted that in different approaches, other metrics may be used to quantify a separation between a current state and any of the future failure conditions, e.g., such as number of tape runs, resistance, a total number of full tape cartridges written to, an amount of time since manufacture, a total amount of data written, etc.

In further approaches, the warning may indicate an inferred cause of the given failure condition. For example, sub-operation 806e may include generating and/or outputting a specific fault-symptom code deduced from the performance data available, and which identifies one of corrosion, wear, debris buildup, damaged wiring, sensitivity loss, electrical shorts, excessive noise, etc. as the cause of the failure condition. Accordingly, a recipient of the output warning may be provided with an initial evaluation of the available performance data such that appropriate subsequent action may be performed to prevent and/or delay the failure condition.

According to some approaches, a warning output in sub-operation 806e may be posted to the tape drive, e.g., as a fault error symptom code.

By maintaining a history of the performance data for a tape drive, determinations as to when a particular issue arose may be made. For example, if previously stored performance data reveals that the resistance of some readers in a magnetic tape head had risen more than can be ascribed to wear, then corrosion, wire bond or lead cracking issues may be ascribed as the cause of the rise in resistance. Accordingly, the tape drive may send an alert (e.g., to a user, administrator, manufacturer, maintenance entity, etc.) that a corrosive agent may be present in the tape drive. By using further information, such a humidity or whether writers also have increased resistance changes, then the drive may be able to narrow the likelihood of whether corrosion or mechanical problems with the leads is the culprit. Adding statistical data from other libraries or failure analysis (FA) on other drives can assist in determining the probability of corrosion vs mechanical lead issues. This rapid warning system may be able to preserve resources by alerting a user to perform corrective actions. Collection and storage of other parameters such as temperature, relative humidity (RH) and tape usage may further assist in trouble shooting the problem before its effects compromise the performance of the tape drive.

As mentioned above, sub-operations corresponding to the performance of operation 806 may include various processes, e.g., depending on the desired embodiment. The sub-operations included therein may determine wear and/or corrosion of the tape drive and/or the magnetic tape head according to different approaches. In some approaches, wear and/or corrosion of the tape drive and/or the magnetic tape head may be determined using wear rates and/or asymptotic values thereof.

In other approaches, wear and/or corrosion of the tape drive and/or the magnetic tape head may be determined using resistance of the tape drive and/or magnetic tape head(s). Thus, an effective stripe height of one or more transducers on the magnetic tape head and/or an effective magnetic spacing between one or more of the transducers and a magnetic tape may be calculated in some embodiments. Furthermore, an indication of wear may be output in response to determining that the effective stripe height has changed and the effective magnetic spacing has changed for a given transducer, and the amount of the change in the calculated SH and the spacing are consistent with one another and with previously-detected changes which were verified through FA to be wear. Moreover, an indication of accumulation on the magnetic tape head may be output in response to determining that the effective magnetic spacing has increased while the effective stripe height has not changed sufficiently to account for the increase in spacing.

An effective stripe height of transducers may be calculated using the resistance and/or resolution thereof. According to one example, the resistance of the sensor of a magnetic tape head may be used to determine the stripe height (SH) of a given current-in-plane (CIP) sensor on the magnetic tape head using Equation 6 below.

$$SH = R_{sheet} * W / R_{head} \qquad \text{Equation 6}$$

$R_{head}$ represents the resistance of the sensor, e.g., with external cable, wire, lead, etc., resistances subtracted away, for which the SH is being determined. Moreover, $R_{sheet}$ represents a sheet resistance, and W represents a corresponding width of the sensor measured in a track width direction.

Similarly, Equation 7 may be used to determine the stripe height (SH) of a given current-perpendicular-to-plane (CPP) sensor on the magnetic tape head having a known resistance-times-area, RA.

$$SH=RA/(W*R_{head}) \qquad \text{Equation 7}$$

As alluded to above, in other approaches, wear and/or corrosion of the tape drive and/or the magnetic tape head may be determined using resolution of the tape drive and/or magnetic tape head(s). According to one example, the spacing between the media facing surface of the tape head, and a surface of the magnetic tape may be calculated using Equation 8 which implements the corresponding resolution Res of the magnetic head.

$$Res(\lambda_1,\lambda_2)=Amp(\lambda_2)/Amp(\lambda_1) \qquad \text{Equation 8}$$

Here, $\lambda_1$ and $\lambda_2$ represent two data wavelengths, where $\lambda_2 < \lambda_1$. Thus, $Res(\lambda_1,\lambda_2)$ represents the ratio of the read-back amplitude at two different data wavelengths. Alternatively, $Res(\lambda_1,\lambda_2)$ may be represented in terms of Wallace spacing losses as shown in Equation 9, where d represents the spacing.

$$Res(\lambda 1,\lambda 2)=e^{(-2*\pi*d*((1/\lambda 2)-(1/\lambda 1)))} \qquad \text{Equation 9}$$

As mentioned above, performance information (e.g., data) may be used to determine the corrosion and/or wear of the one or more transducers on the magnetic tape head. According to some approaches, resistance and/or resolution data may be used to determine an amount of wear experienced by transducers. For example, an increased resistance may indicate wear on a given transducer, e.g., resulting from tape being run thereover. In another example, a SH less than an initial height of the sensor (e.g., before being used) may indicate an amount of wear has occurred on a transducer. In the case of wear, the resistance changes limited by the maximum wear achievable. For example a large wear may recess the reader 30 nm. For a reader with a SH of 600 nm, this corresponds to about a 5% increase in reader resistance. For older generations of magnetic media, an upper limit in wear might be 40 or 50 nm, or about 7 to 9%. In most cases, wear will affect all read elements. Newer generations of magnetic media will need to have even lower limits in wear. It follows that amounts of wear may be "learned" for, e.g., correlated with, a given media type and/or generation. Moreover, embodiments having wear may experience a localized increase in transducer resistances. Moreover, effects resulting from wear may follow a limited wear rate, e.g., which may be determined by experiments. In some approaches, wear may be verified by estimating the spacing between the media facing surface of the tape head and a surface of the magnetic tape. The spacing may be calculated from the resolution data, e.g., such that the change in spacing from before being used, to the current state should be at least similar to the change in SH experienced over the same period.

Similarly, resistance and/or SH data may be used to determine corrosion of transducers on magnetic tape head (s). For example, the effects of corrosion may be detected, and an amount of corrosion may be measured, in response to determining that the resistance is greater than and/or the SH is less than, an initial amount for a given transducer (e.g., before being used). When a reader corrodes, the resistance will increase and the amplitude will decrease. Mild corrosion may result in small changes in resistance, such as a fraction of a percent or a single digit percentage. As the corrosion progresses, the resistance change could increase indefinitely. Thus corrosion can be distinguished from wear by comparing the level of the resistance changes, the standard deviation in the resistance changes, whether all or some of the readers have resistance changes, and also using the resolution.

Corrosion of the material included in a transducer may result in a greater amount of effective SH decrease and/or resistance increase in comparison to the effects caused by wear of a transducer. Thus, the resistance of a corroding transducer may increase to a complete open circuit in some approaches. In other approaches, the effective SH of a corroding transducer may reach a value of zero. Furthermore, for corroding transducers, the distribution of changes to resistance and the effective SH calculated from the change in resistance may vary by greater amounts than experienced as a result of transducer wear, and may therefore fall outside wear rate predictions. Thus, the corrosion determined for each sensor of a magnetic tape head may be averaged across the tape head, e.g., to determine an overall amount of corrosion for the tape head as a whole.

According to another embodiment, operation 806 may include identifying electrical shorts in one or more transducers on the magnetic tape head. Upon shorting, a transducer may be rendered useless, e.g., a shorted read transducer may no longer be able to read data from a magnetic medium. Thus, it is desirable to detect and identify shorted transducers for replacement, compensation, to inform a user, etc. According to some approaches, resistance and/or resolution data may be used to determine shorting of transducers. For example, embodiments having TMR sensors may experience a short across the thin tunnel junction, while embodiments having CIP MR devices (e.g., such as AMR, GMR etc. sensors) may experience a short between the magnetic shields and the MR sensor. A short may be identified when the resistance of the transducer decreases from its original value. However, the resolution of a shorted transducer should not be affected by the short. According to an illustrative embodiment, which is in no way intended to limit the invention, the amplitude response for a TMR sensor at a fixed voltage may not decrease by more than about 10% to about 20%, but could be higher or lower.

In other embodiments, operation 806 may include determining the accumulation of an insulating material on a tape bearing surface of the one or more transducers. During use, transducers on a magnetic tape head may gradually accumulate a layer of insulating material. Although the resistance of the transducers may not be affected by the accumulation of an insulating material on the media facing side thereof, the thickness of the deposited material may directly decrease the amplitude and resolution of the transducer, e.g., corresponding to the Wallace spacing loss, as would be appreciated by one skilled in the art upon reading the present description. Thus, resolution data may be used to calculate a thickness of an insulating material deposited on a media facing side of one or more transducers. According to one example, detecting low resolution for the read-back signal corresponding to a data track written by a poorly performing writer may result in the determination that the writer has undergone corrosion and/or has accumulated material (e.g., insulating material) on a media facing surface thereof. Upon determining that an insulating material has accumulated on a tape bearing surface of the one or more transducers, identifying the one or more transducers for replacement, for compensation, for cleaning, to inform a user, etc., may be desired.

The accumulation of other materials on the media facing surface of one or more transducers may also be identified. According to different approaches, changes in resolution, changes in magnetic amplitude, PW50 increases, SNRa decreases, etc. may indicate Wallace spacing losses which may be identified with the accumulation of material on the media facing surface of one or more transducers. Moreover, the accumulation of other materials on the media facing surface of one or more transducers may not flip the magnetic orientation of layers in GMR transducers.

Further embodiments may include determining that sensors are undergoing degradation from some form of damage to the surface of the sensor. If the resolution of a few readers decreases significantly below the level of the median of all readers and the calculated stripe height increases an amount consistent with the decrease in resolution, then something is damaging the surface portion of the degraded readers to the level of the calculated spacing and SH change. This source of the damage could be corrosion, either from an external corrosive agent or from oxidation of the surface of the sensor from a form of head-tape-interface generated thermal oxidation.

Further still, in other embodiments, operation 806 may include identifying a mechanical bond issue. Mechanical bonding issues may develop over time and have a significant effect on the performance of a magnetic tape head. The resistance of a magnetic tape head may be used to determine the presence of a mechanical bond issue, e.g., for an array of transducers. According to some approaches, if the resistance of several adjacent transducers of a magnetic tape head increase while the resistance of the remaining transducers in the head do not substantially change, then it may be determined that damage to the electrical bonding of the transducers to the corresponding cables has occurred. Moreover, the drive code may record a fault symptom code associated with mechanical bonding issue in response to determining that a mechanical bonding issue has occurred.

It follows that any one or more of the processes which may be performed as a part of operation 806 may be used in predicting future failure conditions of the tape drive and/or the magnetic tape head, e.g., using the information obtained as a result.

Generally, there are a significant number of read and/or write transducers (e.g., elements) included in a given tape drive. This allows tape drives to operate successfully even with less than all of the read elements functioning successfully. Further still, tape drives implement magnetic heads which are in direct contact with the media at a media facing side thereof. Thus, wear is an integral part of a tape drive which is preferably taken into account when performing problem analysis, e.g., to predict future failure conditions.

However, as described above, tape cartridges have a limited amount of memory available to store data. Moreover, there may be a significant number of read and/or write transducers included in a given tape drive. Thus, storing a condensed amount of the collected performance data may be preferred in some embodiments.

Figure 10A:
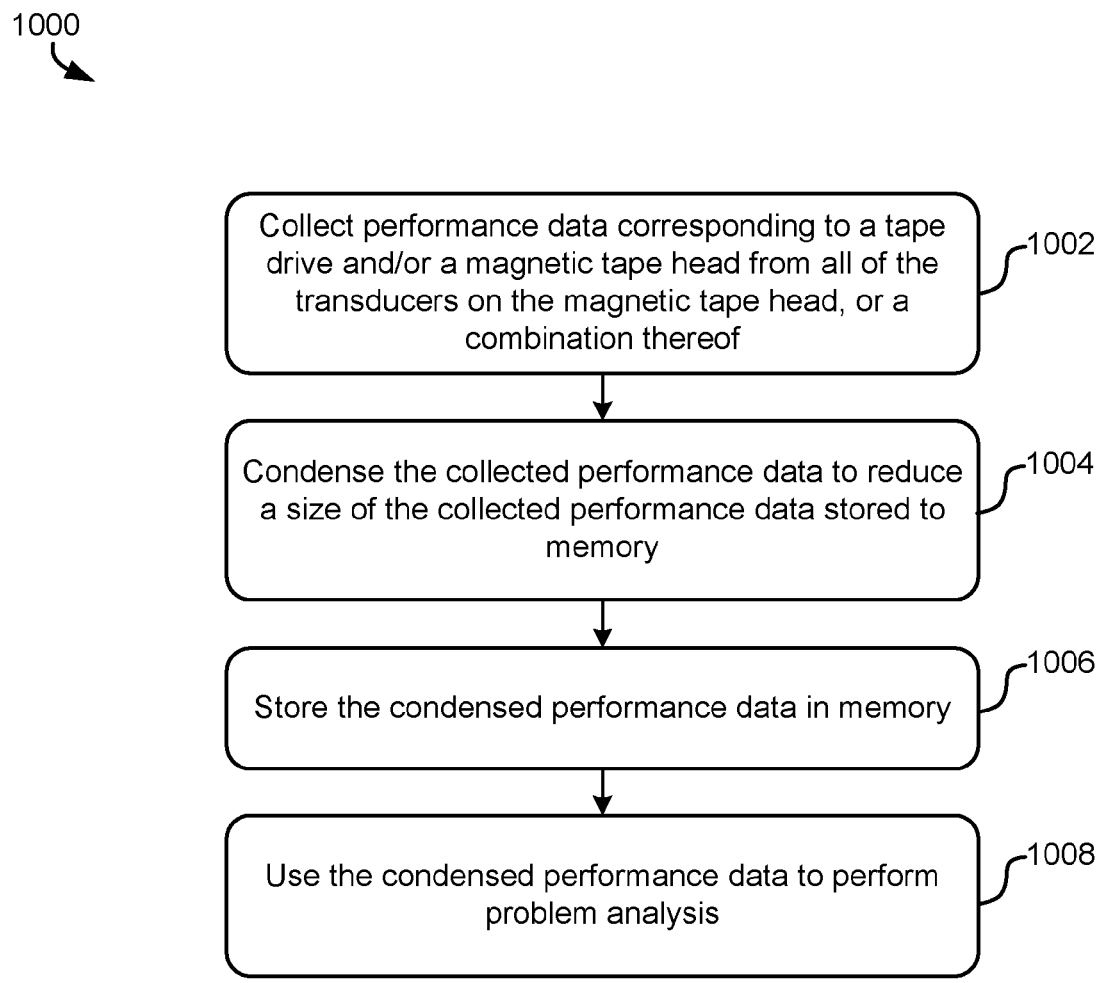
FIG. 10A is a flowchart of a method according to one embodiment.

Looking to FIG. 10A, method 1000 illustrates a flowchart for condensing the collected performance data in accordance with one embodiment. The method 1000 may be performed in accordance with the present invention in any of the environments depicted in FIGS. 1-8C, among others, in various embodiments. Of course, more or less operations than those specifically described in FIG. 10A may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 10A, operation 1002 of method 1000 includes collecting performance data corresponding to a tape drive and/or a magnetic tape head from all of the transducers on the magnetic tape head, or a combination thereof. According to a preferred approach, the performance data is collected sequentially in time, e.g., at intervals, upon user request, upon meeting a predetermined condition, etc. Moreover, operation 1004 includes condensing the collected performance data to reduce a size of the collected performance data stored to memory, e.g., by performing down sampling, while operation 1006 includes storing the condensed performance data in memory, preferably in a structure database. Collected performance data may be condensed by implementing any one of a number of processes, as will soon become apparent.

According to various approaches, condensing the collected performance data may include calculating a mean value of the performance data, a median value of the performance data, a standard deviation of the performance data, a minimum value of the performance data, a maximum value of the performance data, a number of tracks whose values for a given parameter are outside of a predetermined range, a number of tracks whose values deviate from the mean or median by a predetermined deviation, etc., and/or combinations thereof. In another approach, the frequency at which performance data is collected may be changed, e.g., to reduce an amount of performance data at issue. In other approaches, condensing the performance data may include maintaining a rolling average of the performance data in memory, e.g., to lessen the effects of temporary tape drive errors. According to an example, which is in no way intended to limit the invention, a rolling average may include the most recent "N" measured data sets, where the first N collected data sets will be stored in bins B(1) through B(N). Moreover, the "N+m" data set (m=1 to N) will be stored in bin B(m), and data set "p" will be stored in bin B(q), such that q=p−N*floor((p−1)/N), where floor(x) rounds x down to the nearest integer, as would be appreciated by one skilled in the art upon reading the present description.

Table 1 below shows a rolling average calculated for data collected through 24 sets. As illustrated, data is stored in bins B1 through B10, and the rolling average having n=24 is taken from {D15 to D24}, as would be appreciated by one skilled in the art upon reading the present description. Accordingly, when data D11 through D20 are collected, they sequentially overwrite data in bins B1 through B10 respectively.

TABLE 1

| | Bin | | | | | | | | | | |
|---|---|---|---|---|---|---|---|---|---|---|---|
| Pass | B1 | B2 | B3 | B4 | B5 | B6 | B7 | B8 | B9 | B10 | Average |
| 1st | D1 | D2 | D3 | D4 | D5 | D6 | D7 | D8 | D9 | D10 | D1:D10 |
| 2nd | D11 | D12 | D13 | D14 | D15 | D16 | D17 | D18 | D19 | D20 | D11:D20 |
| 3rd | D21 | D22 | D23 | D24 | D15 | D16 | D17 | D18 | D19 | D20 | D15:D24 |

Note that the rolling average needs to be continually recalculated. In the case of replacing bin Bq with the value Dp. Assume that Dq-old is the value currently in bin Bq which will be replaced with the value Dp. Also assume that the rolling average, RollAveOld is current rolling average, then the updated rolling average, RollAveNew is:

$$\text{RollAveNew} = \text{RollAveOld} + (Dp - Dq)/N. \quad \text{Equation 10a}$$

The new standard deviation, STDNew, can then be calculated from the previous standard deviation, STDOld by:

$$\text{STDNew}^2 = \text{STDOld}^2 + (Dp^2 - Dq^2)/N - 2*(\text{RollAveNew}^2 - \text{RollAveOld}^2)/N. \quad \text{Equation 10b}$$

Referring still to FIG. 10A, operation 1008 includes using the condensed performance data to perform problem analysis. According to various approaches, performing the problem analysis of operation 1008 may include any of the processes described herein. In one approach, the problem analysis may include predicting future failure conditions of the tape drive and/or the magnetic tape head, e.g., using the information obtained by any one or more of the sub-operations in FIGS. 8B-8C. In another approach, the problem analysis may include reconstructing when a change in performance of the tape drive and/or the magnetic tape head has occurred in the past, e.g., using tracked changes in the performance data.

As mentioned above, condensing performance data may include a number of different processes. Looking now to FIG. 10B, sub-operations corresponding to the performance of operation 1004 are shown according to one embodiment. The sub-operations of FIG. 10B may be performed in accordance with the present invention in any of the environments depicted in the other FIGS., such as FIG. 10A, among others, in various embodiments. Of course, more or less operations than those specifically described in FIG. 10B may be included in the sub-operations illustrated therein, as would be understood by one of skill in the art upon reading the present descriptions.

As shown, the sub-operations of operation 1004 may include receiving a new set of the collected performance data and overwriting the previous most recent data, and comparing values of the collected performance data with corresponding values of most recent data points of existing performance data. See sub-operations 1004a and 1004b. It follows that the existing performance data may already be stored in the memory, e.g., in a permanent (non-transitory) register.

Looking to decision 1004c, it is determined whether a difference between each of the values of the collected performance data and each of the corresponding values of the most recent data points of the existing performance data are within a range. As illustrated, the process shown in FIG. 10B returns to operation 1004a in response to determining that a difference between a given value of the collected performance data and a corresponding value of the most recent data points is within the range.

Figure 10B:
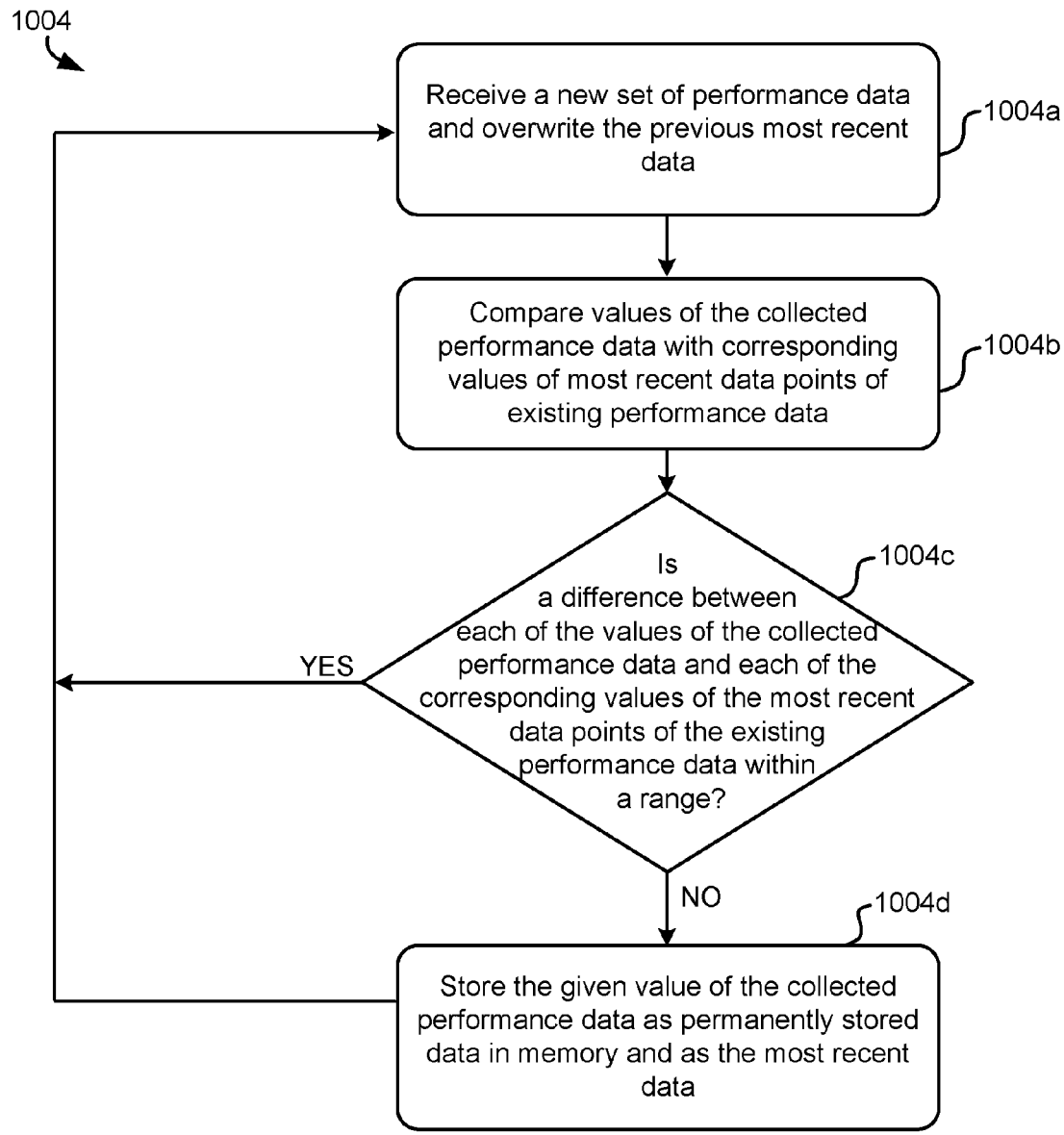
FIG. 10B is a flowchart of sub-operations of the method in FIG. 10A according to one embodiment.

Alternatively, the process shown in FIG. 10B proceeds to operation 1004d in response to determining that a difference between a given value of the collected performance data and a corresponding value of the most recent data points is not within the range. In operation 1004d, the given value of the collected performance data is stored permanently in memory, and is stored as a new most recent data point, thereby replacing the previously most recent data point. By "stored permanently" in this context, what is meant is that the data is stored and is not overwritten by other operations in process 1004. Such data may be copied, deleted and/or overwritten at a later time, such as upon storing on an external storage media and performing a failure analysis, re-initiation of process 1000 of FIG. 10A, reboot of the drive, replacing the defective component, such as a defective head, etc. Note that values that are "temporarily" stored, such as the most recent data, may be overwritten e.g., in operation 1004a.

It follows that only collected performance data that varies from a previously stored value greater than a predetermined amount is stored permanently in memory. As a result, the limited amount of available memory is desirably not used to simply store redundant copies of performance data. Rather, by limiting the amount of data stored to only include the collected performance data which deviates from a last stored value by a certain amount, important transitions in performance may be selectively stored. Thus, a current status of the tape drive and/or the magnetic tape head may be determined by comparing collected performance data with a predetermined range.

One problem with a rolling average approach is that earlier data is lost. One can be creative and combine techniques. For example, one could combine a rolling average with a permanent data set. That is, if the difference in the value of a parameter exceeds a certain number, then that rolling average is added to the permanent stored data. The rolling average continues to be taken in the rolling average bins, but a second storage file contains the information whenever large changes have occurred, and those data sets are not overwritten.

As previously mentioned, the range may separate acceptable (e.g., good) and unacceptable (e.g., bad) performance data for the tape drive and/or magnetic tape head(s). However, it should be noted that "within a certain range" and "outside the range" are in no way intended to limit the invention. Rather, than determining whether the performance data is within or outside a certain range, equivalent determinations may be made, e.g., as to whether the performance data is above a threshold, below a threshold, having an absolute value above a threshold, having an absolute value within a range, etc., depending on the desired approach.

In other words, the processes described in FIGS. 10A-10B may be used to determine whether collected data should be stored in memory. As mentioned above, data may be collected on a regular basis, upon request, when specific conditions have been met (e.g., when certain parameters are to be recalibrated), etc. However, a data value may only actually be stored if the collected value has changed from a corresponding previously stored value by at least a given amount. Then the collected data value may overwrite the temporary data. Moreover, the collected data value may be stored permanently if the value has changed from the corresponding previously stored value by more than a specified amount. For example, if Pn represents the nth permanently stored value, while "T" represents a temporary stored current value, then with respect to the case of N permanent stores, the data may be represented as P(1), . . . , P(N),T. It follows that, if the change is large enough, then the new data is stored both as P(N+1) as the temporary stored value T, whereby the data may be represented as P(1), . . . , P(N), P(N+1), such that P(N+1)=T. Moreover, it is preferred that all stored data is tagged both for real and use time.

According to another example, which is in no way intended to limit the invention, the processes of FIGS. 10A-10B may be used to measure and record performance parameters and use parameters for a tape drive having multiple read and/or write channels. Moreover, the processes of FIGS. 10A-10B may be able to record the number of read and/or write channels which exceed a pre-determined clip performance value "$N_{poor}$" and the measure of use "x" at which each channel is anticipated to exceed the clip performance value. Clip performance values $N_{poor}$ may be plotted on a graph with respect to the measure of use x. A monotonically changing function as shown in Equation 11 may be used to extrapolate a projected time for failure.

$$N_{poor}(x) = 1 - \exp\left(\left(\frac{t}{\tau d}\right)^\beta\right) \quad \text{Equation 11}$$

Here $\tau$ and $\beta$ are fitting parameters as would be appreciated by one skilled in the art upon reading the present description.

In another example, which is again in no way intended to limit the invention, data already stored in memory (e.g., the most recent data points of the existing performance data) may have permanently stored data sets, {P(1), P(2), . . . , P(N)}, where there are N permanently stored data sets. Moreover, the newly collected performance data sets may be stored in temporary data storage locations "T". The data stored in T may be compared to the data in permanent storage location P(N); if the values of the data stored in T differ from the values of the data stored in P(N) by more than a user specified amount, then the data in T is preferably copied into a new permanent storage location, P(N+1). As a result, there may then be N+1 permanently stored data sets.

Figure 11A:
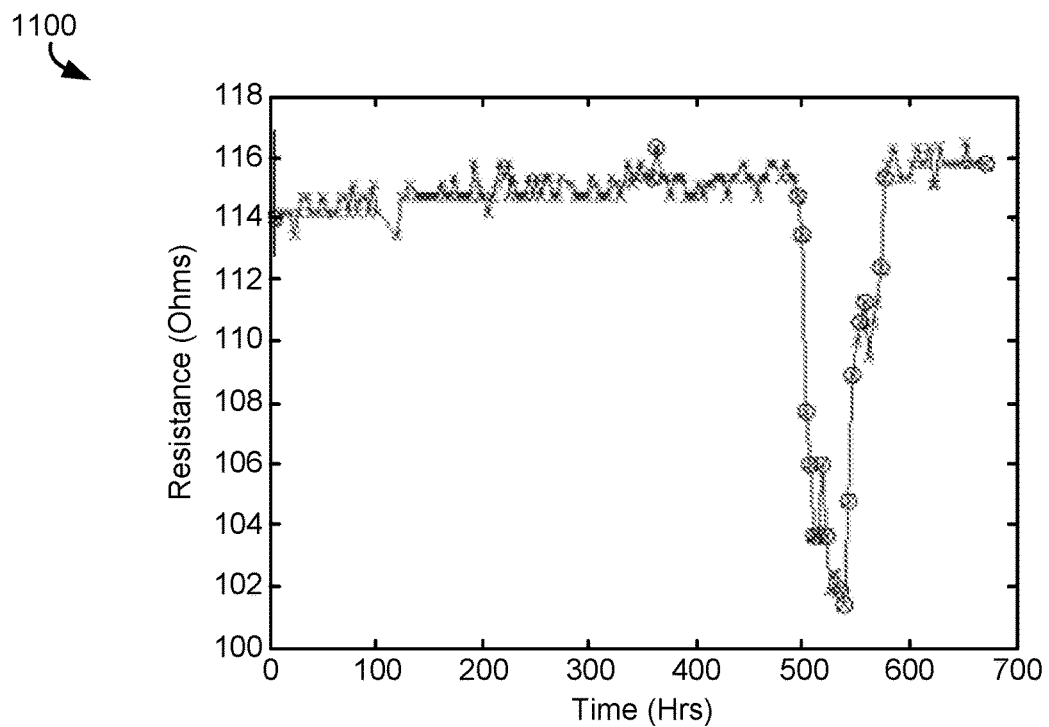
FIGS. 11A-11B are graphs showing change in resistance vs. elapsed time for performance information of a tape drive according to two different embodiments.
Figure 11B:
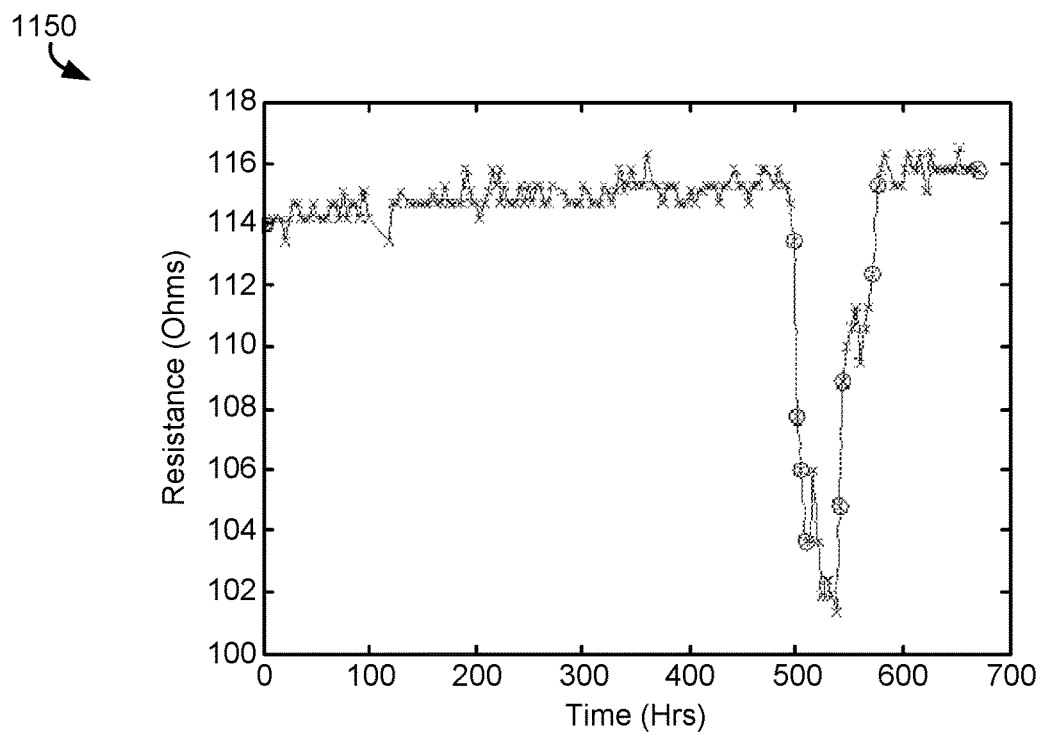

Referring now to FIGS. 11A-11B, graphs 1100, 1150 illustrate plots of resistance values with respect to time for a given tape drive. The number of data points included in the graphs 1100, 1150 was reduced from an initial number of collected data points. Looking specifically to FIG. 11A, a clip performance value of 2 ohms was used to compress an originally collected 172 data points to the 22 data points included in graph 1100, thereby resulting in a 88.4% reduction. Similarly, a clip performance value of 4 ohms was used in the embodiment corresponding to FIG. 11B, thereby compressing the originally collected 172 data points to the 10 data points included in graph 1150, thereby resulting in a 94.2% reduction.

Figure 12A:
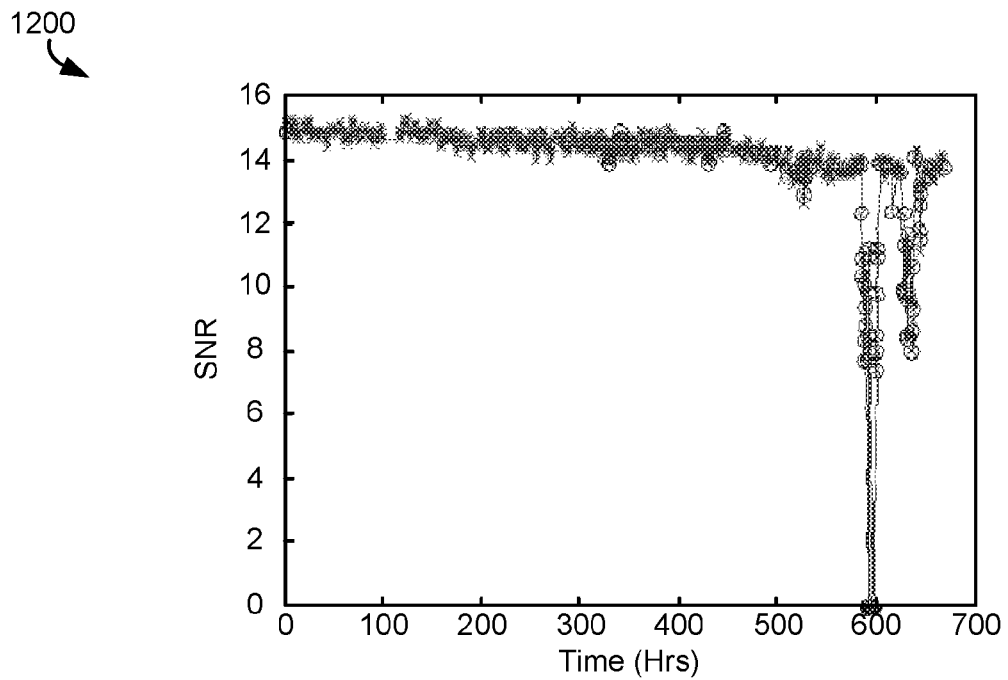
FIGS. 12A-12B are graphs showing change in signal to noise ratio (SNR) vs. elapsed time for performance information of a tape drive according to two different embodiments.
Figure 12B:
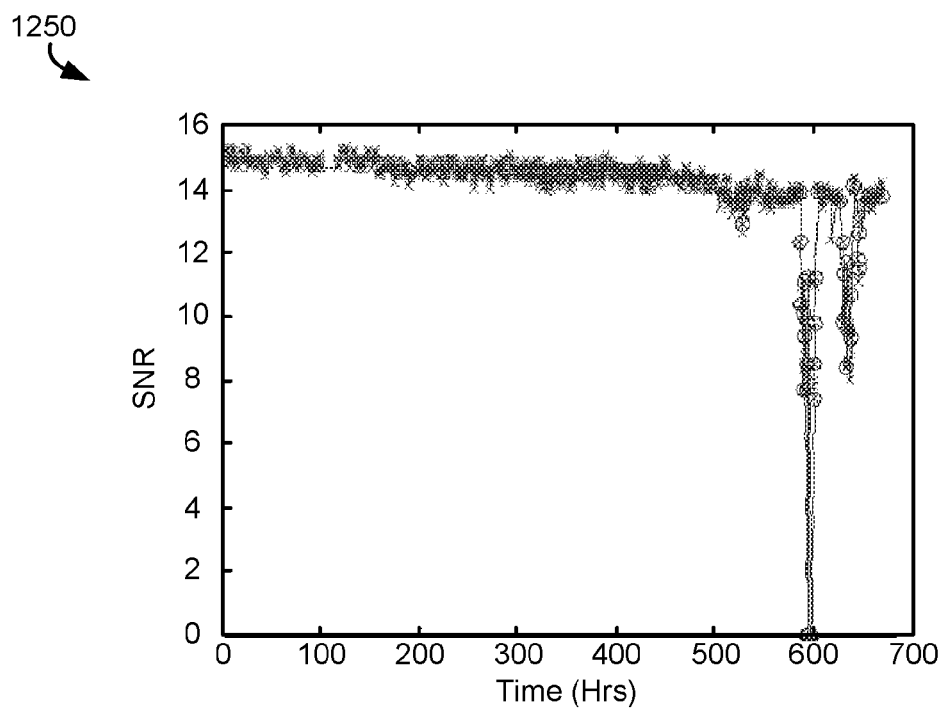

FIGS. 12A-12B include graphs 1200, 1250 which illustrate plots of SNR with respect to time for a given tape drive. Again, the number of data points included in the graphs 1200, 1250 was reduced from an initial number of collected data points. Looking specifically to FIG. 12A, a clip performance value of 1 was used to compress an originally collected 1539 data points to the 63 data points included in graph 1200, thereby resulting in a 95.9% reduction. Similarly, a clip performance value of 2 was used in the embodiment corresponding to FIG. 12B, thereby compressing the originally collected 1539 data points to the 38 data points included in graph 1250, thereby resulting in a 97.5% reduction.

Figure 13A:
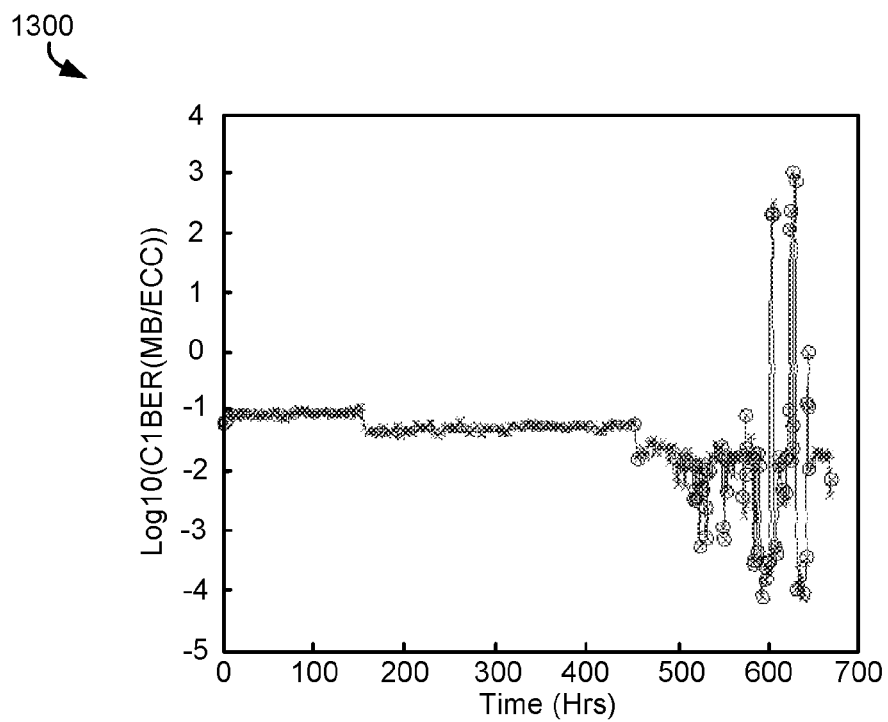
FIGS. 13A-13B are graphs showing change in C1 bit error rate (BER) measurements vs. elapsed time for performance information of a tape drive according to two different embodiments.
Figure 13B:
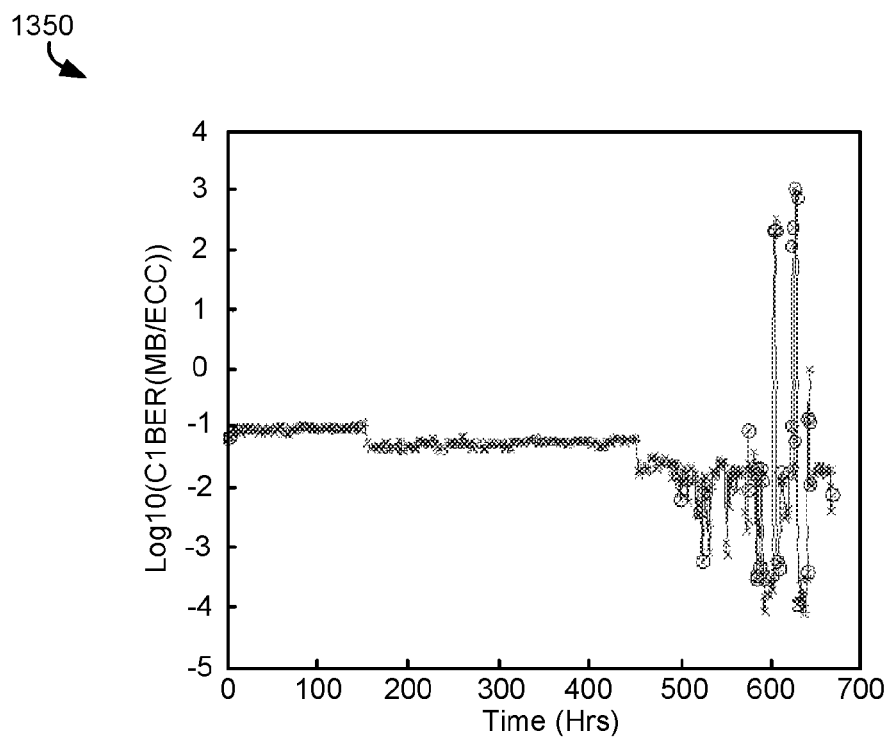

Looking now to FIGS. 13A-13B, graphs 1300, 1350 illustrate plots of C1 BER measurements with respect to time for a given tape drive. Again, the number of data points included in the graphs 1300, 1350 was reduced from an initial number of collected data points. Looking specifically to FIG. 13A, a clip performance value of 0.5 was used to compress an originally collected 688 data points to the 69 data points included in graph 1300, thereby resulting in a 89.7% reduction. Similarly, a clip performance value of 1 was used in the embodiment corresponding to FIG. 13B, thereby compressing the originally collected 688 data points to the 36 data points included in graph 1350, thereby resulting in a 94.6% reduction.

Figure 14A:
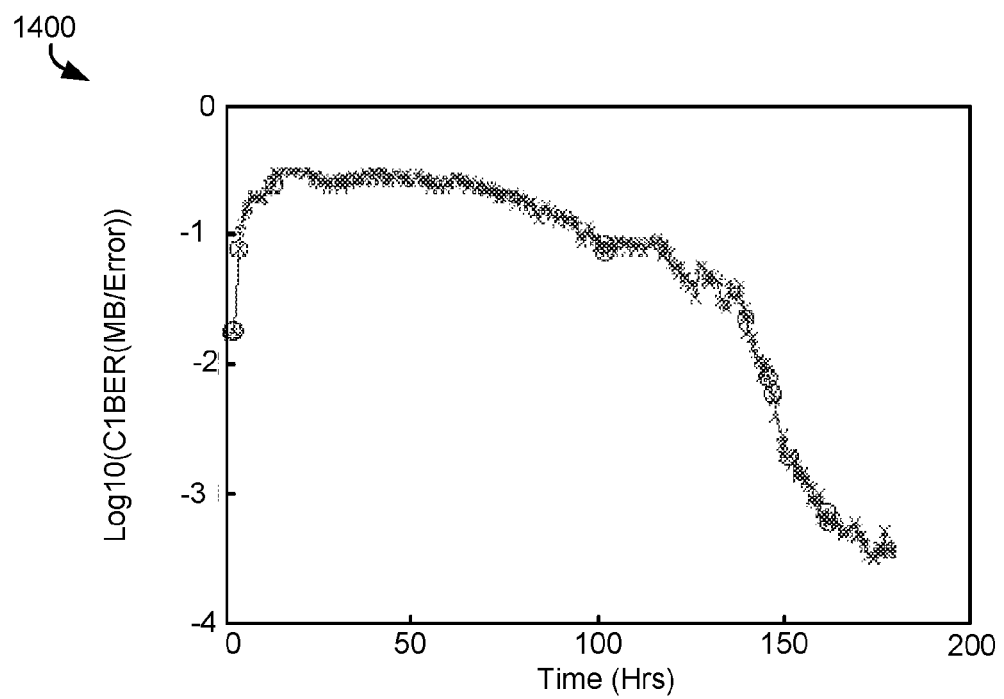
FIGS. 14A-14B are graphs showing change in C1 BER measurements vs. elapsed time for performance information of a tape drive according to two different embodiments.
Figure 14B:
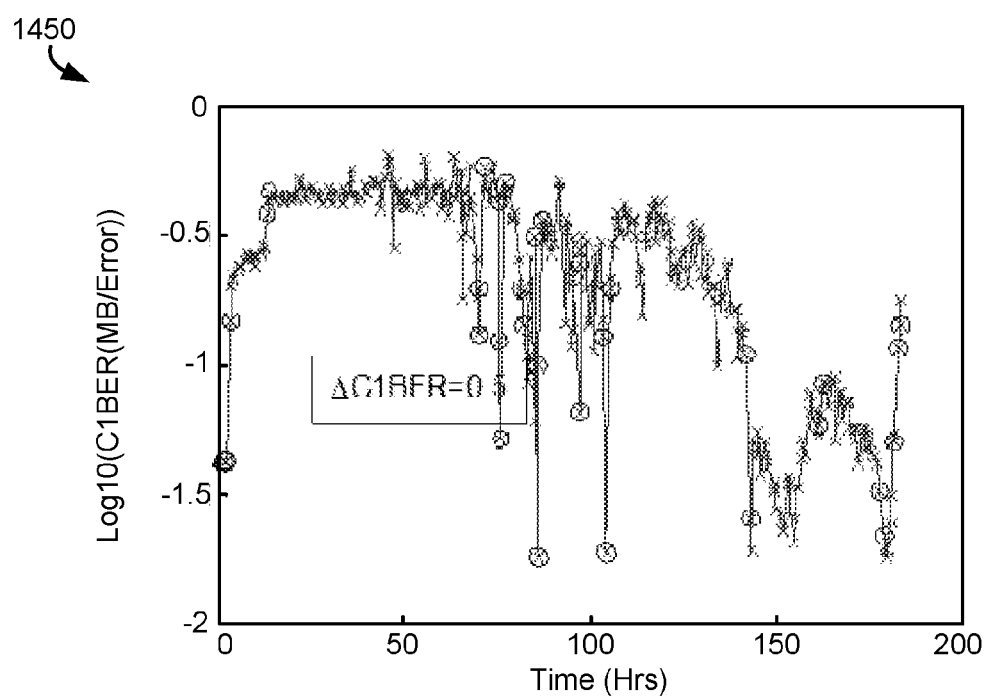

Similarly, FIGS. 14A-14B include graphs 1400, 1450 which illustrate plots of C1 BER measurements with respect to time for two different tracks of a given tape drive. Here the number of data points included in the graphs 1400, 1450 was reduced from an initial number of collected data points by implementing the same clip performance values to the data collected to each of the different tracks. Looking specifically to FIG. 14A, the originally collected 368 data points were compressed to the 13 data points included in graph 1400, thereby resulting in a 96.5% reduction for track 16. Similarly, in FIG. 14B the originally collected 368 data points were compressed to the 33 data points included in graph 1450, thereby resulting in a 91.0% reduction for track 1. Here, the larger number of data points resulting for track 1 compared with the data points resulting for track 16 may result from a larger variability in track 1 as opposed to track 16.

Figure 15A:
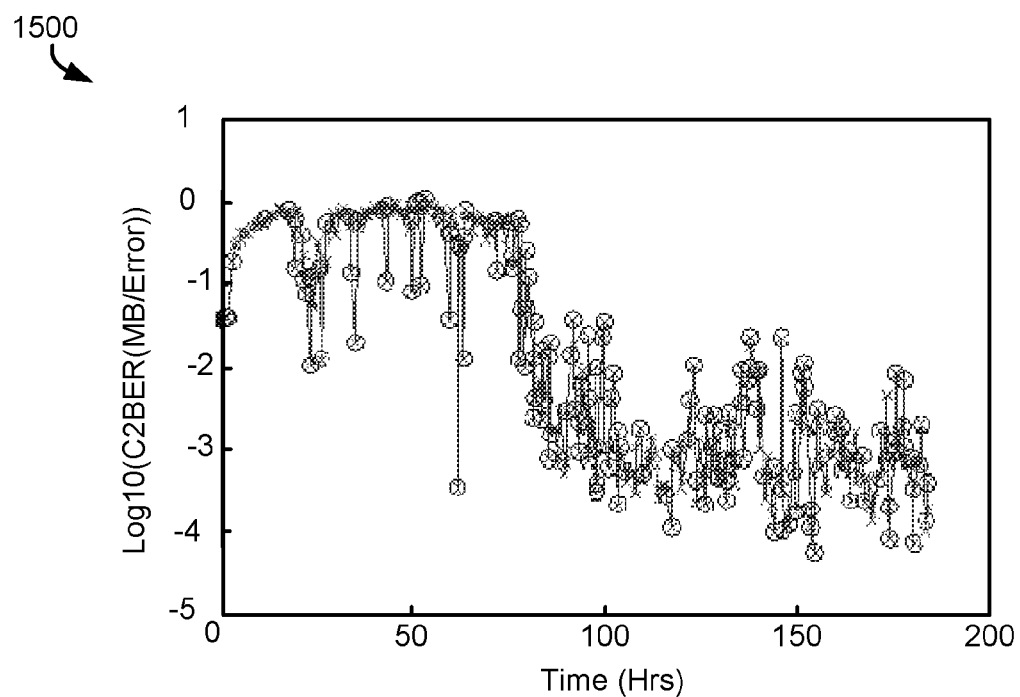
FIGS. 15A-15B are graphs showing change in C2 BER measurements vs. elapsed time for performance information of a tape drive according to two different embodiments.
Figure 15B:
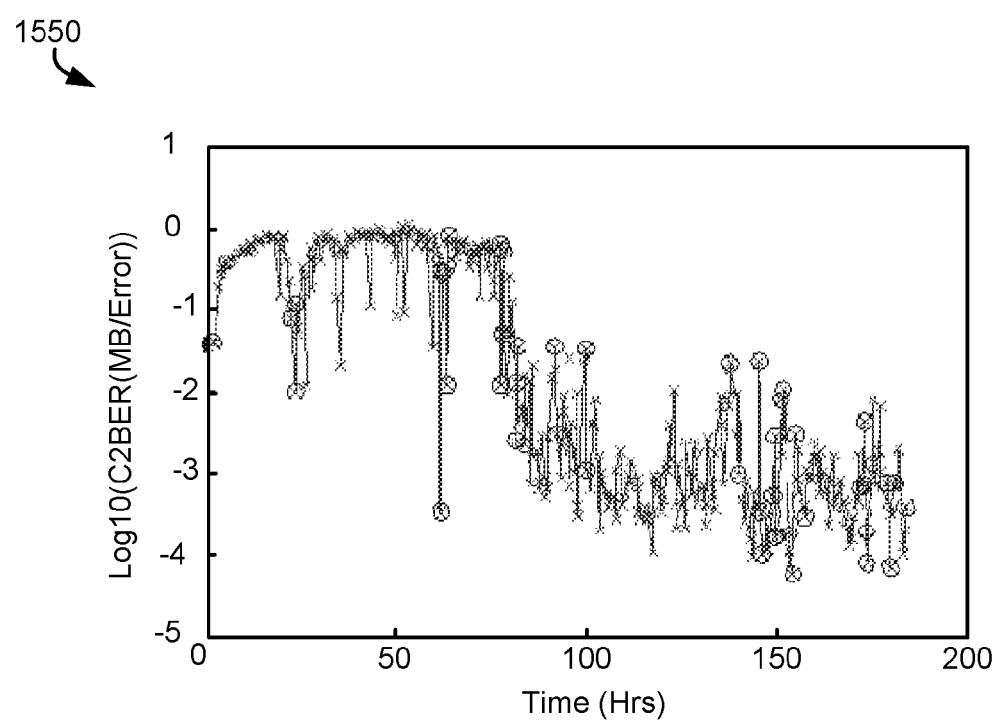

Looking now to FIGS. 15A-15B, graphs 1500, 1550 depict plots of C2 BER measurements with respect to time for a given tape head. Looking specifically to FIG. 15A, a clip performance value of 0.5 and a dFClip value of 0.5 for log 10(C2BER) were implemented to compress an originally collected 368 data points to the 169 data points included in graph 1500, thereby resulting in a 54% reduction. Similarly, a clip performance value of 1 and a dFClip value of 0.5 for log 10(C2BER) were used in the embodiment corresponding to FIG. 15B, thereby compressing the originally collected 368 data points to the 48 data points included in graph 1550, thereby resulting in a 87% reduction.

However, it should be noted that although graph 1550 of FIG. 15B includes significantly fewer points than graph 1500 of FIG. 15A, the added data compression in graph 1550 caused significant data transitions to be lost (e.g., cut out). According to one approach, additional statistical data, e.g., such as the range, average, standard deviation, etc. for each point, may be collected and preferably used to recover some of the lost data information. For example, if the data of graph 1550 is used with the average, range and/or standard deviation between points being collected, the 48 points becomes 3×48=144, thereby raising the amount of data up to the same level as that included in graph 1500. Although this process may increase the amount of data included by about 100% for each additional point, it may be desirable in view of the recaptured performance data, e.g., in terms of problem analysis.

Figure 16A:
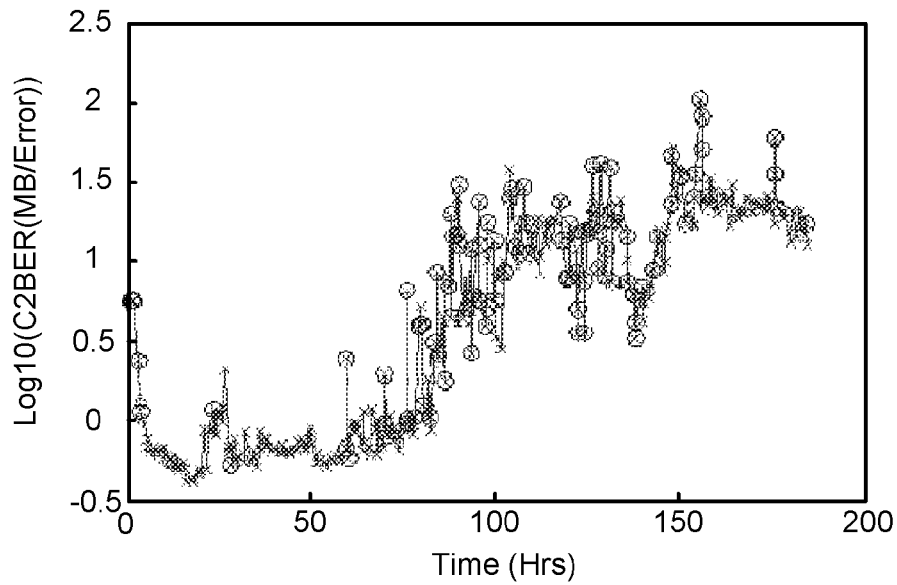
FIGS. 16A-16B are graphs showing change in C2 BER measurements vs. elapsed time for performance information of a tape drive according to two different embodiments.
Figure 16B:
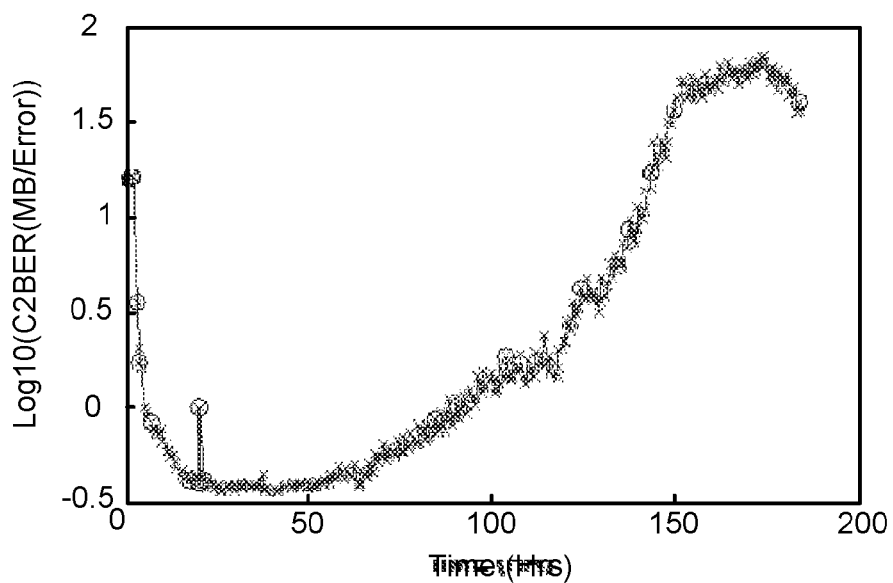

FIGS. 16A-16B include graphs 1600, 1650 which depict C2 BER measurements with respect to time for a given tape head. Specifically, graphs 1600, 1650 include data corresponding to re-write measurements for forward and reverse modules, respectively. Here the number of data points included in the graphs 1600, 1650 was reduced from an initial number of collected data points by implementing the same clip performance value of 0.3 and dFClip value of 0.5 for log 10(C2BER) to the data collected in both the forward and reverse modules. Looking specifically to FIG. 16A, the originally collected 368 data points were compressed to the 101 data points included in graph 1600, thereby resulting in a 73% reduction for the forward module. Similarly, in FIG. 16B the originally collected 368 data points were compressed to the 16 data points included in graph 1650, thereby resulting in a 95.7% reduction for the reverse module.

As mentioned above, tape drives may include multiple data read and/or write channels. In such tape drives, the error correction codes may be robust and may accordingly tolerate multiple poorly performing parameters before the tape drive itself fails (e.g., is inoperable). For example, for a 32 channel tape drive, the probability of the drive surviving with only one poorly performing track may be close to 100%, but the survival probability decreases as the number of poorly performing tracks increases. Accordingly, the probability of failure increases as the number of poorly performing tracks increases. Therefore, a metric which uses the rate of accumulation of poor performing tracks may be used to predict future failure conditions as described herein. According to different approaches, the metrics used may include resistance, SNRa, Amplitude, etc. In other approaches, an increased number of read and/or write attempts, error rates (e.g., BER), etc., may be used to predict a future failure condition.

A function which represents the probability of failure may depend on the number of failing tracks "$N_{poor}$". Moreover, the function may further be represented in terms of the number of poorly performing tracks (e.g., a SNR value below SNRmin) versus a use parameter "x", e.g., represented by $F(N_{poor}(x))$. As described above, examples of a use parameter x may be time since the drive was built, the number of tapes written to, the number of full-file-passes on tape, the total amount of data written, etc. Values for the parameters $N_{poor}$ and x are measured and collected, e.g., for use with different performance data, such as BER, SNR, resistance, resolution, etc.

$N_{poor}(x)$ may be fit to a function, where $N_{poor}(x)=(1-\exp((t/\tau_a)^\beta))$, such that $\tau$ and $\beta$ are fitting parameters. The function may preferably be used to extrapolate a projected time for failure. For example, Table 2 below presents a list of failure probability values for F relative to a corresponding SNR. According to the present example, the tape drive may preferably report a 50% failure rate which corresponds to a $N_{poor}$ value of 4. Thus, the data corresponding to values of 1, 2 and/or 3 for $N_{poor}$ may be used to project a measure of use, e.g., the amount of time, until a value of 4 for $N_{poor}$ is reached. The table may be generated using field failures and updated as more data is collected.

TABLE 2

| $N_{poor}$ | (#) | 1 | 2 | 3 | 4 | 5 | 6 | 7 | 8 | 9 |
|---|---|---|---|---|---|---|---|---|---|---|
| F | (%) | 10 | 25 | 40 | 50 | 60 | 80 | 90 | 95 | 100 |

According to yet another example, some magnetic tape heads may include two write transducers for each read transducer. Accordingly, one write transducer may be used to write data in a first direction, while the second transducer may be used to write data in a second direction opposite the first direction. Therefore, it may be concluded that one of the write transducers is performing poorly (e.g., is damaged) in response to determining that the read-back amplitude and/or SNR is in a desirable range while reading data written by the first write transducer in the first direction, while the read-back amplitude and/or SNR is in an undesirable range while reading data written by the second write transducer in the second direction. An indication of the poorly performing write transducer is preferably stored, e.g., the drive code may record a fault symptom code associated with the particular writer. A similar approach can be used in the case of two readers per writer, that if one reader functions properly while the second reader performs poorly, then the problem is with the poor performing reader and not the writer.

It follows that various embodiments described herein may be able to perform problem analysis to predict future failure conditions and preferably issue warnings to avoid such failure conditions. By collecting and analyzing stored performance information concerning tape head and/or tape drive quality, efficiency of tape drive operation as a whole may be improved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
   collecting performance data corresponding to a tape drive and/or a magnetic tape head, wherein the performance data includes a resistance of the tape drive and/or magnetic tape head and a resolution of the tape drive and/or the magnetic tape head;
storing the performance data in memory;
using the data to perform problem analysis,
wherein performing the problem analysis includes:
  determining a condition of the tape drive and/or the magnetic tape head,
  tracking changes to the performance data over time, and
  calculating an effective stripe height of one or more transducers on the magnetic tape head and/or an effective magnetic spacing between one or more transducers on the magnetic tape head and a magnetic tape;
outputting an indication of wear in response to determining that the effective stripe height has changed and the effective magnetic spacing has changed for a given one of the transducers; and
outputting an indication of accumulation on the magnetic tape head in response to determining that the effective stripe height has not changed and the effective magnetic spacing has changed,
wherein the condition is selected from a group consisting of: wear, corrosion, defective leads and wire bonds.

2. The computer-implemented method as recited in claim 1, comprising:
detecting a change in the resistance of the tape drive and/or magnetic tape head which is larger than can be ascribed to wear; and
determining that corrosion, defective leads and/or a wire bond issue are present in response to detecting the change.

3. The computer-implemented method as recited in claim 1, wherein performing the problem analysis includes:
identifying a mechanical bond issue and/or predicting future failure conditions of the tape drive and/or the magnetic tape head.

4. The computer-implemented method as recited in claim 1, wherein performing the problem analysis includes:
reconstructing when a change in performance of the tape drive and/or the magnetic tape head occurred at a previous point in time; and
extrapolating future failure conditions of the tape drive and/or the magnetic tape head from the tracked changes in the performance data.

5. The computer-implemented method as recited in claim 4, comprising:
determining a cause of the change in performance of the tape drive and/or the magnetic tape head in response to reconstructing when the change in performance of the tape drive and/or the magnetic tape head occurred at the previous point in time.

6. A computer program product comprising a computer readable storage medium having program instructions embodied therewith, the program instructions executable by a controller to cause the controller to:
collect, by the controller, performance data corresponding to a tape drive and/or a magnetic tape head, wherein the performance data includes a resistance of the tape drive and/or magnetic tape head and a resolution of the tape drive and/or the magnetic tape head;
store, by the controller, the performance data in memory;
use, by the controller, the data to perform problem analysis,
wherein performing the problem analysis includes:
  determining, by the controller, a cause of an issue of the tape drive and/or the magnetic tape head,
  tracking, by the controller, changes to the performance data over time, and
  calculating, by the controller, an effective stripe height of one or more transducers on the magnetic tape head and/or an effective magnetic spacing between one or more transducers on the magnetic tape head and a magnetic tape;
output, by the controller, an indication of wear in response to determining that the effective stripe height has changed and the effective magnetic spacing has changed for a given one of the transducers; and
output, by the controller, an indication of accumulation on the magnetic tape head in response to determining that the effective stripe height has not changed and the effective magnetic spacing has changed,
wherein the cause of the issue is selected from a group consisting of: wear, corrosion, defective leads and wire bonds.

7. The computer program product as recited in claim 6, the program instructions executable by the controller to cause the controller to:
detect, by the controller, a change in the resistance of the tape drive and/or magnetic tape head which is larger than can be ascribed to wear; and
determine, by the controller, that corrosion, defective leads and/or a wire bond issue are present in response to detecting the change.

8. The computer program product as recited in claim 6, wherein performing the problem analysis includes:
identifying, by the controller, a mechanical bond issue and/or predicting, by the controller, future failure conditions of the tape drive and/or the magnetic tape head.

9. The computer program product as recited in claim 6, wherein performing the problem analysis includes:
reconstructing, by the controller, when a change in performance of the tape drive and/or the magnetic tape head occurred at a previous point in time; and
extrapolating, by the controller, future failure conditions of the tape drive and/or the magnetic tape head from the tracked changes in the performance data.

10. The computer program product as recited in claim 9, the program instructions executable by the controller to cause the controller to:
determine, by the controller, a cause of the change in performance of the tape drive and/or the magnetic tape head in response to reconstructing when the change in performance of the tape drive and/or the magnetic tape head occurred at the previous point in time.

11. A system, comprising:
a processor and logic integrated with and/or executable by the processor, the logic being configured to cause the processor to:
collect performance data corresponding to a tape drive and/or a magnetic tape head, wherein the performance data includes a resistance of the tape drive and/or magnetic tape head and a resolution of the tape drive and/or the magnetic tape head;
store the performance data in memory;
use the data to perform problem analysis, wherein performing the problem analysis includes:
  determining a condition of the tape drive and/or the magnetic tape head,
  tracking changes to the performance data over time, and
  calculating an effective stripe height of one or more transducers on the magnetic tape head and/or an effective magnetic spacing between one or more transducers on the magnetic tape head and a magnetic tape;

output an indication of wear in response to determining that the effective stripe height has changed and the effective magnetic spacing has changed for a given one of the transducers; and output an indication of accumulation on the magnetic tape head in response to determining that the effective stripe height has not changed and the effective magnetic spacing has changed, wherein the condition is selected from a group consisting of: wear, corrosion, defective leads and wire bonds.

12. The system as recited in claim 11, comprising logic being configured to cause the processor to:

detect a change in the resistance of the tape drive and/or magnetic tape head which is larger than can be ascribed to wear; and determine that corrosion, defective leads and/or a wire bond issue are present in response to detecting the change.

13. The system as recited in claim 11, wherein performing the problem analysis includes:

identifying a mechanical bond issue and/or predicting future failure conditions of the tape drive and/or the magnetic tape head.

14. The system as recited in claim 11, wherein performing the problem analysis includes:

reconstructing when a change in performance of the tape drive and/or the magnetic tape head occurred at a previous point in time;

extrapolating future failure conditions of the tape drive and/or the magnetic tape head from the tracked changes in the performance data; and determining a cause of the change in performance of the tape drive and/or the magnetic tape head in response to reconstructing when the change in performance of the tape drive and/or the magnetic tape head occurred at the previous point in time.

* * * * *